(12) United States Patent
Parrish

(10) Patent No.: US 9,584,495 B2
(45) Date of Patent: Feb. 28, 2017

(54) METHOD AND SYSTEM FOR ESTABLISHING SECURE COMMUNICATIONS USING COMPOSITE KEY CRYPTOGRAPHY

(71) Applicant: Grey Heron Technologies, LLC, Earlysville, VA (US)

(72) Inventor: David L. Parrish, Earlysville, VA (US)

(73) Assignee: Grey Heron Technologies, LLC, Earlysville, VA (US)

( * ) Notice: Subject to any disclaimer, the term of this patent is extended or adjusted under 35 U.S.C. 154(b) by 127 days.

(21) Appl. No.: 14/564,890

(22) Filed: Dec. 9, 2014

(65) Prior Publication Data
US 2015/0180843 A1 Jun. 25, 2015

Related U.S. Application Data

(63) Continuation of application No. 13/788,613, filed on Mar. 7, 2013, now Pat. No. 8,914,635.
(Continued)

(51) Int. Cl.
*H04L 29/06* (2006.01)
*H04L 9/06* (2006.01)
*H04L 9/08* (2006.01)

(52) U.S. Cl.
CPC .......... *H04L 63/061* (2013.01); *H04L 9/065* (2013.01); *H04L 63/0428* (2013.01);
(Continued)

(58) Field of Classification Search
CPC .......... H04L 63/0428; H04L 63/0442; H04L 63/061; H04L 9/0866; H04L 9/065; H04L 2463/061
(Continued)

(56) References Cited

U.S. PATENT DOCUMENTS 5,369,705 A * 11/1994 Bird ..................... H04L 9/0833
713/155
5,592,552 A * 1/1997 Fiat ..................... H04L 63/0442
380/278
(Continued)

OTHER PUBLICATIONS

PCI Security Standards Council, 'PCI Point-to-Point Encryption Solution Requirements: Encryption, Decryption, and Key Management within Secure Cryptographic Devices (Hardware/Hardware)', PCI Security Standards Council LLC, Sep. 2011, entire doc., https://www.pcisecuritystandards.org/documents/P2PE_Hardware_Solution_%20Requirements_Initial_Release.pdf.*
(Continued)

*Primary Examiner* — Kari Schmidt
*Assistant Examiner* — Ronald Baum
(74) *Attorney, Agent, or Firm* — Hunton & Williams LLP

(57) ABSTRACT

A method is disclosed for establishing a secure communication session using composite key cryptography. The method comprises generating a first plurality of secret keys all of which are known only to a first communicating party and each one of which is shared with exactly one of a plurality of stewards, and generating a second plurality of secret keys all of which are known only to a second communicating party and each one of which is shared with exactly one of the plurality of stewards. The first and second communicating parties each send information to the other through different stewards, each communication leg being encrypted using a secret key known only to the respective communicating party and steward. These communications are usable to distribute cryptographic seeds to the communicating parties for use in generating a temporary session key that can be used to encrypt direct communications between the parties.

14 Claims, 17 Drawing Sheets

Related U.S. Application Data

(60) Provisional application No. 61/680,470, filed on Aug. 7, 2012.

(52) U.S. Cl.
CPC ........ *H04L 9/0866* (2013.01); *H04L 63/0442* (2013.01); *H04L 2463/061* (2013.01)

(58) Field of Classification Search
USPC .......................................................... 713/171
See application file for complete search history.

(56) References Cited

U.S. PATENT DOCUMENTS

| | | | |
|---|---|---|---|
| 5,708,714 A * | 1/1998 | Lopez | H04L 9/085 380/286 |
| 5,748,734 A * | 5/1998 | Mizikovsky | H04L 9/0869 380/247 |
| 5,850,451 A | 12/1998 | Sudia | |
| 6,002,768 A * | 12/1999 | Albanese | H04N 7/15 348/E7.071 |
| 6,263,436 B1 | 7/2001 | Franklin | |
| 6,363,154 B1 | 3/2002 | Peyravian et al. | |
| 6,636,968 B1 * | 10/2003 | Rosner | H04L 9/0833 713/178 |
| 6,687,822 B1 | 2/2004 | Jakobsson | |
| 6,886,096 B2 | 4/2005 | Appenzeller et al. | |
| 7,212,634 B2 * | 5/2007 | Briscoe | H04L 9/0836 380/203 |
| 7,574,596 B2 * | 8/2009 | Chen | H04L 9/083 713/159 |
| 8,316,237 B1 | 11/2012 | Felsher et al. | |
| 8,473,756 B2 * | 6/2013 | Orsini | G06F 21/6209 713/193 |
| 8,843,997 B1 | 9/2014 | Hare | |
| 8,867,747 B2 * | 10/2014 | McGrew | H04L 9/083 380/278 |
| 2002/0071560 A1 | 6/2002 | Kurn et al. | |
| 2002/0087862 A1 | 7/2002 | Jain et al. | |
| 2003/0229789 A1 * | 12/2003 | Morais | H04L 9/083 713/171 |
| 2004/0008846 A1 * | 1/2004 | Medvinsky | H04L 9/083 380/278 |
| 2004/0123159 A1 * | 6/2004 | Kerstens | H04L 12/24 726/12 |
| 2005/0050328 A1 * | 3/2005 | Mizrah | H04L 9/3273 713/171 |
| 2005/0097317 A1 * | 5/2005 | Trostle | H04L 9/0833 713/163 |
| 2006/0034456 A1 * | 2/2006 | McGough | H04L 9/0844 380/30 |
| 2006/0053288 A1 * | 3/2006 | Stern | H04L 9/0844 713/168 |
| 2006/0177056 A1 * | 8/2006 | Rostin | H04L 9/0869 380/46 |
| 2006/0242407 A1 * | 10/2006 | Kimmel | H04L 63/0428 713/166 |
| 2006/0271785 A1 * | 11/2006 | Holtmanns | H04L 63/06 713/171 |
| 2008/0175393 A1 * | 7/2008 | Oba | H04L 63/062 380/279 |
| 2008/0304662 A1 * | 12/2008 | Strobl | H04L 9/0841 380/44 |
| 2009/0287922 A1 * | 11/2009 | Herwono | H04L 9/0822 713/155 |
| 2010/0174899 A1 * | 7/2010 | Lin | H04L 9/0833 713/153 |
| 2010/0191970 A1 * | 7/2010 | Singer | H04L 9/083 713/171 |
| 2011/0231655 A1 * | 9/2011 | Bollay | H04L 63/166 713/153 |
| 2012/0324218 A1 | 12/2012 | Duren et al. | |
| 2013/0028410 A1 | 1/2013 | Parrish | |

OTHER PUBLICATIONS

Ngo, H.H., et al, 'Dynamic Key Cryptography and Applications', Intl Journal of Network Security, vol. 10, No. 3, pp. 161-174, May 2010, http://ijns.jalaxy.com.tw/contents/ijns-v10-n3/ijns-2010-v10-n3-p161-174.pdf.* http://web.mit.edu/kerberos, "Kerberos: The Network Authentication Protocol", Mar. 5, 2013, pp. 1-3.

Malin, B., et al., "Configurable Security Protocols for Multi-party Data Analysis with Malicious Partcipants", Sep. 2004, School of Computer Science, Carnegie Mellon University, CMU-ISRI-04-132, entire document, http://reportsarchive.adm.cs.cmu.edu/anon/isri2004/CMU-ISRI-04-132.pdf.

Canetti, et al., "Adaptively Secure Multi-party Computation", Feb. 1996, TR-682, LCS/MIT, entire document, http://theory.csail.mit.edu/ftp-data/pub/people/oded/tr682.ps.

* cited by examiner

METHOD AND SYSTEM FOR ESTABLISHING SECURE COMMUNICATIONS USING COMPOSITE KEY CRYPTOGRAPHY

CROSS REFERENCE TO RELATED APPLICATION

This application is a continuation of U.S. application Ser. No. 13/788,613, filed on Mar. 7, 2013 (now U.S. Pat. No. 8,914,635), which claims priority to U.S. Provisional Application No. 61/680,470, filed Aug. 7, 2012, entitled Composite Key Cryptography, both of which are incorporated herein by reference in their entirety. The subject matter of this application also relates to the subject matter of U.S. application Ser. No. 13/189,936, filed Jul. 25, 2011, which is also incorporated herein by reference in its entirety.

FIELD OF THE INVENTION

The present invention relates generally to the science of cryptography, and more particularly to symmetric encryption systems, protocols, and methods for establishing secure communication sessions across a public network.

BACKGROUND

Publicly available symmetric encryption algorithms (e.g., Triple DES, RC4, AES, etc.) are widely accepted as providing secure communications between any two parties who share a secret symmetric encryption key, hereinafter referred to as a "SecretKey." This SecretKey, known only to the two parties, may be used to create encryption sessions which allow the two parties to communicate securely across a public network with the assurance that no unauthorized third party will easily be able to eaves-drop on the plaintext protected by the encrypted communications. The stronger the encryption algorithm, the more difficult the challenge becomes to correctly decrypt into plaintext any ciphertext being exchanged by the two parties. An advantage of symmetric encryption is that each party is assured of the cryptographic identity of the other party by the successful decryption of received ciphertext into meaningful plaintext, provided that both parties and the protocols employed adequately protect the SecretKey from disclosure.

However, it is widely accepted that using only symmetric cryptography to provide secure communications between any two parties within a large community of registered members is impractical. This belief is based upon the well-documented mathematics used to calculate the number of different SecretKeys that must be generated, distributed and managed to support the entire community. In accepted practice, each member of a registered community must share a different SecretKey with every other member, the total number of SecretKeys being determined by the formula: $(N \times (N-1))/2$, where N is the number of members in the community. Thus, for a community of 1,000 members, exactly 499,500 different SecretKeys would be required for each member to share a different SecretKey with every other member. Of course, this is the maximum number of required SecretKeys since all members in the community may not wish to communicate securely with all other members. Still, the key generation, management, and distribution logistics for managing and maintaining SecretKeys even for subsets of members within such a relatively small community is daunting, requiring complex security mechanisms to assure each member that no SecretKey has been disclosed to anyone other than the two parties sharing the key. For larger communities having millions of members, the potential number of SecretKeys is staggering. Such logistical problems led to the adoption of protocols (e.g. Transport Layer Security) that employ asymmetric encryption algorithms to secure internet communications.

In general, asymmetric encryption algorithms employ public-key/private-key pairs. Messages encrypted using the public-key may only be easily decrypted using the paired private-key. Clients wishing to establish a secure connection with a particular host server are supplied by the host with a public-key with which to encrypt initial connection-request messages. The host server is then able to use the private-key to decrypt such messages that typically contain session-specific information such as a temporary SecretKey, which may then be used to initialize a symmetric encryption algorithm to encrypt subsequent messages. However, assurances to either party as to the certified identity of the other party must be accomplished independently.

For client identification and authentication, secure host servers have adopted the use of usernames and passwords. However, password cracking has been developed into a science by the hacker community, making simple passwords inadequate. In consequence, more and more complex password constructs are now required, resulting in the practice of users having the same password for multiple sites or maintaining password lists near their computers. Both practices create serious security vulnerabilities that may be exploited. Also, a lost or forgotten password has now become a frequently recurring problem that must be dealt with using additional security measures.

For host identification and authentication, a trusted third party (certification authority) is required to assure a client that a published public-key is truly associated with the identity of a specific secure host website. Phishing sites with website displays similar to legitimate sites have been developed and successfully employed to steal username/password combinations from unsuspecting users who have been directed to these sites by redirection clicks within emails or by icons on illicit websites. Few users check to ensure that their web browser is displaying the secure lock icon or to carefully examine the website address displayed by the browser to assure that it is correct, particularly now that most website addresses have become so complex. As a counter-measure, some secure servers have adopted the practice of associating a client-selected icon with the username of each client. This icon is displayed on the password entry screen to reassure the client of the identity of the host. Many such adopted solutions are site-specific. Viewed as a whole, they impose a hodge-podge of security measures that inadequately address the security issue of dual-authentication while irritating and frustrating the user community. None of these measures approach the level of security offered by a secure protocol that uses only symmetric encryption.

Kerberos, a publicly available network authentication protocol developed at the Massachusetts Institute of Technology, is one such protocol that uses only symmetric encryption. The Kerberos protocol, based upon the Needham-Schroeder symmetric encryption protocol, specifies the content of specific data packets and a sequence of data packet exchanges by the participating parties to establish a secure session using only symmetric encryption. The Kerberos protocol improves upon Needham-Schroeder by inclusion of a timestamp used to defeat packet replay attacks. The foundation of the Kerberos protocol security is the "Authentication Server," a trusted third party having a database containing a SecretKey for every registered user in the community. In general, using the appropriate SecretKeys within its database, the Authentication Server authenticates each of the two parties wishing to establish a secure session on the network, securely distributing a temporary SecretKey to both parties within encrypted message data packets. These data packets are encrypted using an encryption session initialized with the SecretKey shared by the Authentication Server with each party to encrypt that party's data packet. One practical drawback to this approach is the threat represented by insider access to the SecretKey database of the Authentication Server. Anyone illicitly obtaining the SecretKey of a single user would be able to successfully masquerade as that user. Of course, the compromise of the entire SecretKey database of an Authentication Server would wreak havoc, as demonstrated by the recent security breaches affecting well-known and widely used security systems (e.g., the compromise of SecurID keys of RSA Security in March 2011).

SUMMARY OF THE INVENTION

An aspect of the present invention provides a method for establishing a secure communications session over a network between a first communicating party and a second communicating party. The method comprises generating a first digital composite key comprising a first plurality of secret keys. Each of the first plurality of secret keys is known only to the first communicating party and exactly one of a plurality of trusted parties and each of the plurality of trusted parties knows exactly one of the first plurality of secret keys. The method further comprises generating a second digital composite key comprising a second plurality of secret keys. Each of the second plurality of secret keys is known only to the second communicating party and exactly one of the plurality of trusted parties and each of the plurality of trusted parties knows exactly one of the second plurality of secret keys. The method still further comprises selecting a first trusted party from the plurality of trusted parties, encrypting first information by the first communicating party using the secret key known only to the first communicating party and the first trusted party, and sending the encrypted first information by the first communicating party to the first trusted party. Second information is encrypted by the first trusted party using the secret key known only to the second communicating party and the first trusted party to provide first encrypted second information. The first encrypted second information is then sent by the first trusted party to the second communicating party. The method also comprises decrypting the first encrypted second information by the second communicating party.

In some embodiments of the invention, the above-described method may also comprise selecting a second trusted party from the plurality of trusted parties, the second trusted party being different from the first trusted party, encrypting third information by the second communicating party using the secret key known only to the second communicating party and the second trusted party, and sending the encrypted third information by the second communicating party to the second trusted party. In these embodiments the method may further comprise encrypting fourth information by the second trusted party using the secret key known only to the first communicating party and the second trusted party to provide first encrypted fourth information, sending the first encrypted fourth information by the second trusted party to the first communicating party, and decrypting the first encrypted fourth information by the first communicating party.

Another aspect according to certain embodiments of the present invention provides a system for establishing secure communication sessions over a network. The system comprises a plurality of steward data processors, each steward data processor being capable of selective communication with each other steward data processor over the network, and a plurality of registrant data processors. Each registrant data processor is configured for selective communication with each other registrant data processor and each steward data processor over the network and for generating a temporary session key for use in establishing a symmetric key encryption session with one or more of the other registrant data processors. Each registrant data processor has stored therein a registrant composite key comprising a plurality of secret keys equal in number to the plurality of steward data processors. Each secret key is shared with exactly one of the plurality of steward data processors and is known only to that registrant and that steward data processor. Each steward data processor has stored therein a steward composite key comprising the secret keys shared with that steward data processor by the plurality of registrant data processors. Each steward data processor is configured for receiving a first encrypted data packet from a first registrant data processor that is one of the registrant data processors. The first encrypted data packet comprises first information encrypted by the first registrant data processor using the secret key known only to the first registrant data processor and the steward data processor. Each steward data processor is further configured for encrypting second information using the secret key known only to the steward data processor and a second registrant data processor that is one of the registrant data processors to provide a second encrypted data packet. The second information is or includes at least a portion of the first information. Each registrant data processor is also configured for sending the second encrypted data packet to the second registrant data processor. In some embodiments of this system, the second information comprises a seed key that is usable by the first and second registrant data processors to generate a first temporary session key for use in establishing a symmetric key encryption session between the first and second registrant data processors. In some embodiments, the second information comprises a first seed key that is usable by the first and second registrants in combination with a second seed key to generate a first temporary session key for use in establishing a symmetric key encryption session between the first and second registrants. The second seed key is unknown to the steward data processor and the temporary session key cannot be generated or determined from either the first seed key or the second seed key alone.

Other aspects and advantages of the invention will become apparent from the following descriptions which, taken in conjunction with the accompanying drawings, illustrate the principles of the invention by way of example.

DETAILED DESCRIPTION OF THE INVENTION

The present invention is an innovative method and system that introduces a protocol using only symmetric cryptography to securely distribute two or more secret cryptographic seed keys, or "SeedKeys", across a public network to two or more parties within a large community of registered members without requiring that any member share a SecretKey with other members. The participating parties are each then able to independently combine the SeedKeys to create SessionKeys, two or more new temporary SecretKeys known only to the participating parties, which may be used to initialize encryption sessions to support direct secure communications between the participating parties. Further, the present invention creates such secure communications sessions between two or more parties in a manner that assures each participating party of the identity of every other participating party. The mutual authentication strategy of the present invention makes obsolete the impracticable and unsatisfactory requirement for maintaining multiple combinations of usernames and complex passwords for identity authentication since none need be exchanged once a secure communications session has been established, thereby eliminating a major source of cybersecurity threats.

Figure 1:
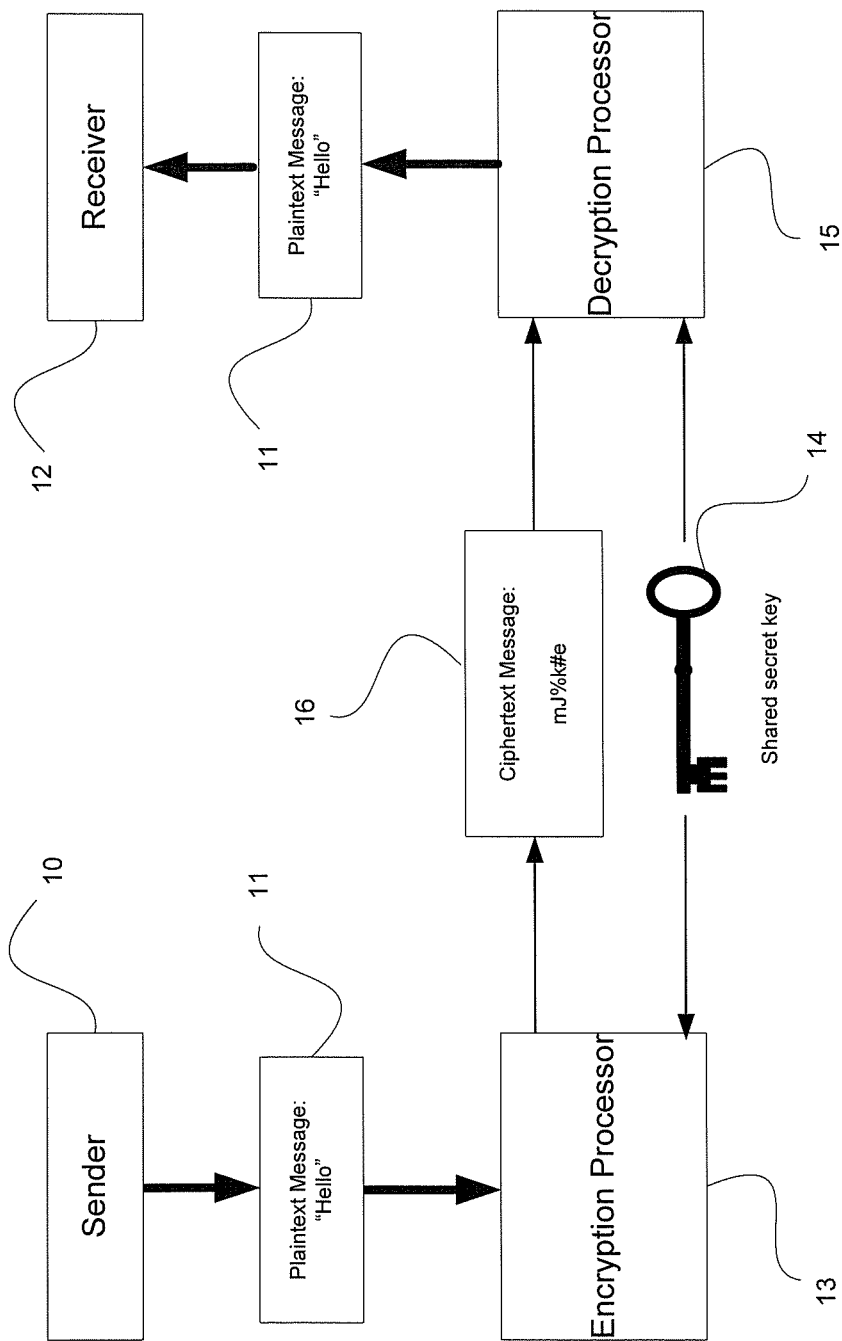
FIG. 1 is a block diagram illustrating a generic symmetric encryption process.

For purposes of illustration, FIG. 1 shows a conventional symmetric encryption process. Using symmetric cryptography, a sender 10 is able to securely send a plaintext message 11 to a receiver 12. The sender 10 and receiver 12 both have a copy of a shared SecretKey 14, which is used by an encryption processor 13 to encrypt plaintext message 11 into ciphertext 16. The shared SecretKey 14 is also used by a decryption processor 15 to decrypt ciphertext 16 and reproduce plaintext message 11.

A major disadvantage of conventional symmetric cryptography is that it requires each communicating member to share a different SecretKey with every other potential communicating member, which, for even relatively small communities of users, requires an unwieldy key-management process in order to oversee and control the secret creation, distribution, and maintenance of large sets of SecretKeys. Further, conventional symmetric cryptography is unsatisfactory in that no member of the community is provided a key that is known only to that member, and which allows that member to be authenticated to all other members without revealing that key. The present invention provides each member with such a key, referred to herein as a Composite Key, a set of SecretKeys known in its entirety only to that member, a major innovation to symmetric cryptography that introduces significant advantages over conventional systems and methods.

In the methods of the present invention, registered members of a community (a plurality of entities 112), hereinafter referred to as registrants, that wish to communicate with each other over a public network via a secure communications session use multiple trusted third parties selected from a plurality of trusted third parties 114, hereinafter referred to as as stewards, to securely distribute two or more SeedKeys, temporary SecretKeys, for use in establishing secure communication sessions. According to these methods, each registrant and each steward is assigned a unique identifier within the community. Each registrant also has a Composite Key, a set of SecretKeys that allows the registrant to communicate securely with every steward using symmetric encryption. Each SecretKey within the Composite Key of a registrant is shared only with a single steward, and the complete set of SecretKeys within the Composite Key contains one SecretKey associated with the unique identifier of every steward. The Composite Key of each registrant is thereby known in its entirety only to the individual registrant. Similarly, each steward also has a Composite Key that allows the steward to use a symmetric encryption session to communicate securely with every registrant and, optionally, all other stewards. Each SecretKey within the Composite Key of a steward is known only to the steward and a single registrant or other steward. The entire set of SecretKeys within the Composite Key of each steward therefore contains a SecretKey associated with the identifier of each different registrant and, optionally, each different steward. Thus, the Composite Key of each steward is known in its entirety only to that steward.

The Composite Key is a revolutionary concept allowing verifiable identity assurance which may be proven by the ability of any party participating in a protocol instance to successfully encrypt and decrypt a sequence of messages exchanged with multiple stewards. This and other concepts of the present invention dramatically broaden the scope for symmetric cryptography applications. Conventionally in symmetric cryptography, a SecretKey shared by two communicating entities makes the two entities indistinguishable, each able to masquerade as the other. This is not true of a Composite Key which is known in its entirety only to one entity, thereby providing irrefutable identity assurance for establishing secure communications to construct and authenticate, for example, credit card transactions, electronic checks, authentication of legal documents, the casting of ballots in federal or state elections, secure telephone calls, etc.

Figure 2:
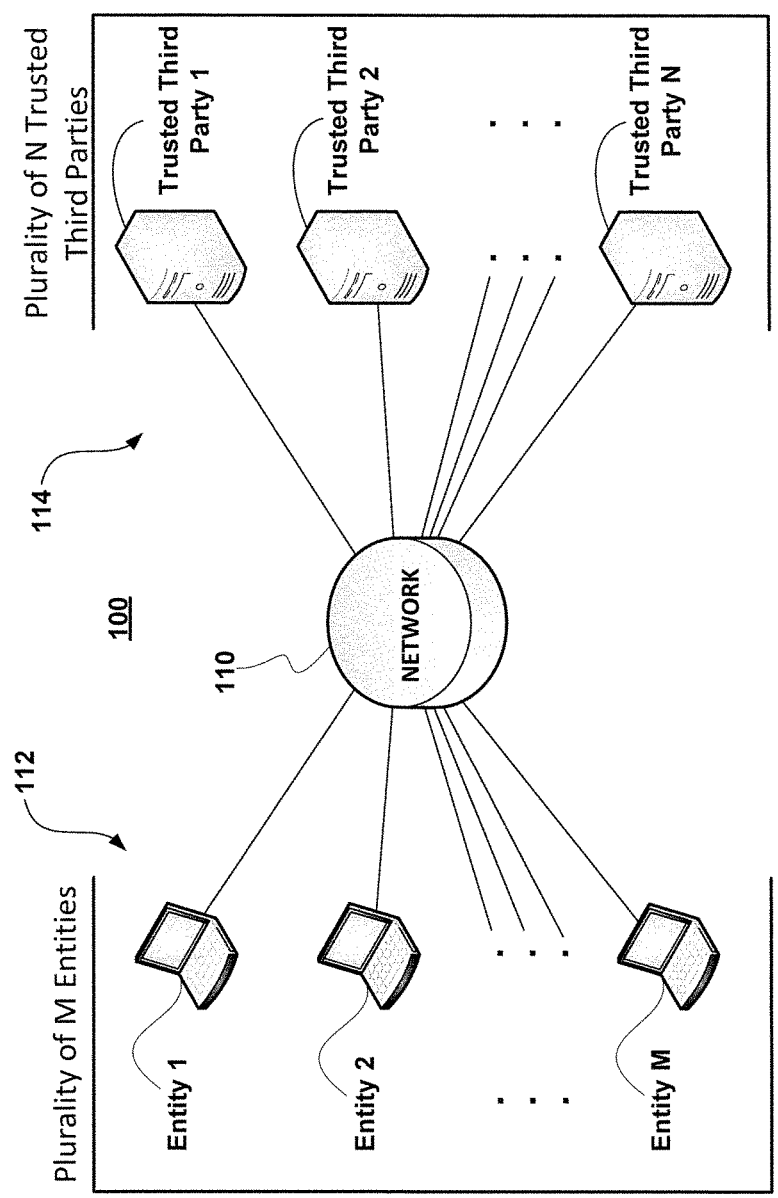
FIG. 2 illustrates a plurality of M entities and a plurality of N trusted third parties connected to a network according to an embodiment of the invention.
Figure 3:
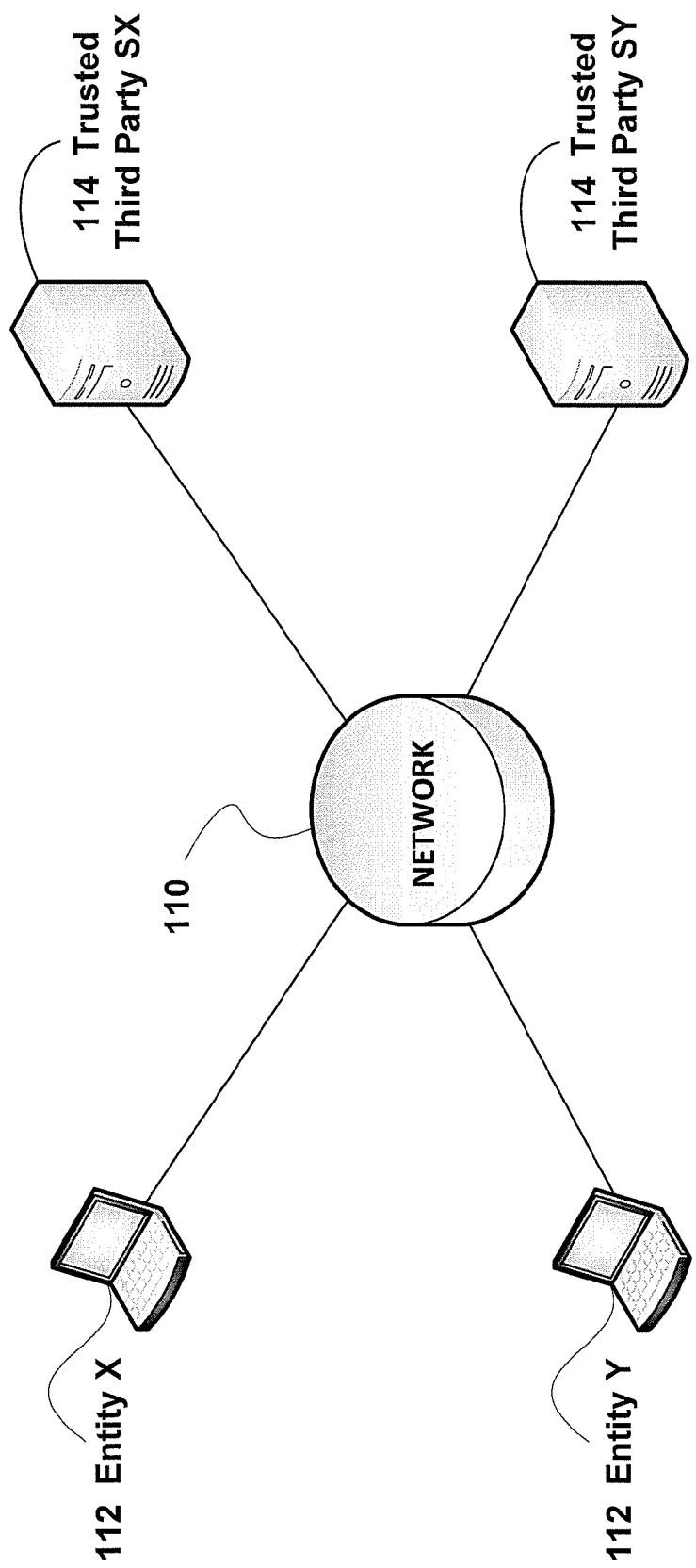
FIG. 3 illustrates two entities and two trusted third parties communicating with each other via a network according to an embodiment of the invention.

As shown in FIG. 2, an illustrative system 100 for establishing secure communications according to the methods of the invention may comprise any number of registrants 112 (members of the plurality of Entities) who wish to communicate securely with each other via a network 110. The system 100 may further comprise any number of stewards 114 (members of the plurality of Trusted Third Parties) to facilitate communications between the registrants 112. FIG. 3 illustrates a specific pair of entities 112 (identified as X and Y), communicating over the network 110 with a specific pair of trusted third parties 114 (identified as SX and SY), which will be used in the following examples to illustrate various aspects of the invention.

Multiple independent communities of registrants with a corresponding set of supporting stewards may be created for various purposes. For example, one community might include a mix of individuals, financial institutions, and brokerage houses. Other communities might consist of a collection of individuals, or a group of financial entities, private corporations, or government entities, etc. Each registrant may use a general purpose computer, a smartphone, a personal security device, a tablet, or other communications device, having a processor and a memory, which may be in the form of a database, to carry out the methods of the present invention. Each steward is a trusted third party server, dedicated to establishing secure communication sessions for the associated community of registrants using Composite Key protocols, and may be located within a secure facility and operated by a private corporation, government entity, etc.

Figure 4:
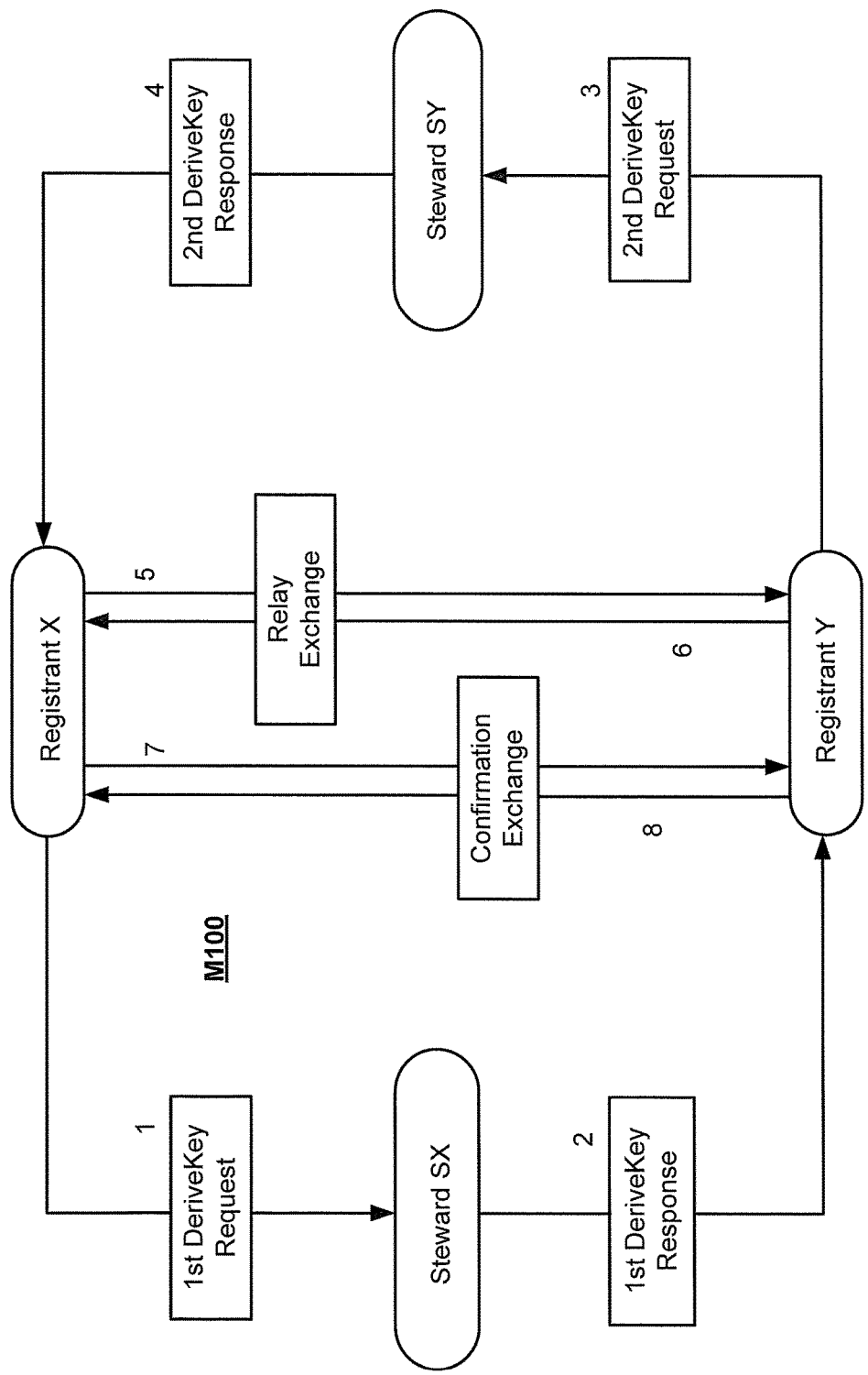
FIG. 4 illustrates an exemplary method of an embodiment in which SX and SY, two different stewards, each a member of a plurality of trusted third parties 114, cooperate in a logical sequence of messages to establish a secure communications session between X and Y, two different registrants, each a member of a plurality of entities 112, which also authenticates each registrant to the other, according to an embodiment of the invention.

Exemplary embodiments of the present invention use encrypted data packets contained within a sequence of messages exchanged over a public network between two or more different registrants and two or more different stewards for the purpose of establishing a secure communications session between the registrants. FIG. 4 illustrates the flow of messages in a method M100 according to an exemplary embodiment of the invention. As illustrated in FIG. 4, messages 1-8 are exchanged between two communicating registrants, X and Y, and two stewards, SX and SY, which are independently selected by X and Y, respectively. The data packets within the messages exchanged between the participating registrants and stewards in FIG. 4 are encrypted using four different SecretKeys, two from within the Composite Key of each of the two registrants X and Y, each of which is shared by that respective registrant only with one of the stewards, SX or SY. Further details of the exemplary encrypted data packets within the paired request and response messages of FIG. 4 are described with reference to FIGS. 5-8. The encrypted data packets include parameters designed to allow validation and authentication of packet contents and to protect against the disclosure, or even the compromise, of any SecretKey to any participating entity as well as any non-participating entity that may be monitoring messages exchanged over a public network. As illustrated in FIG. 4, each steward cooperates with a different participating registrant to "restrictively generate" one or more SeedKeys, directly or indirectly distributing the SeedKey(s) to both registrants. The exemplary Combine method of the present invention embodies one strategy for accomplishing the "restrictive generation" of a SeedKey in a manner that prevents either of two cooperating parties from unduly dictating results. This strategy allows one party only to specify a RootKey, an ordered plurality of unique values, each of which must appear within the SeedKey, and allows the other party only to specify an OrderKey, an ordered plurality of values used to reorder the values within the RootKey to produce the SeedKey. Each steward distributes the restrictively generated SeedKey(s) by encrypting a separate data packet for each participating registrant which provides that registrant with the SeedKey(s). Optionally, the data packet for a registrant directly cooperating with the steward may instead contain the OrderKey which allows that registrant to reproduce the restrictive generation of the SeedKey(s). Either alternative allows a directing registrant to verify that the steward has properly performed the restrictive generation of the SeedKey(s) using the supplied Root-Key(s).

It will be understood that messages exchanged by participating registrants and stewards may be sent over the public network directly to the intended recipient, or indirectly via another participating party, since each encrypted data packet can only be readily decrypted by the intended recipient using the appropriate SecretKey. The exemplary embodiment illustrated in FIG. 4 adopts an indirect method in which each steward sends a response message to a single registrant, each response message containing two encrypted data packets, one for each registrant. The request and response message sequence of the exemplary embodiment allows a logical ordering of the sequence of messages associated with a protocol instance. Each of the two data packets within a response message sent by a steward contains the restrictively generated SeedKey(s), or optionally, information allowing reproduction of that SeedKey by a directing registrant. When registrants X and Y have both successfully received and decrypted their respective data packets containing the SeedKeys, one generated by each steward, SX and SY, the SeedKeys can be independently combined by the two registrants to create SessionKeys, new temporary SecretKeys known only to X and Y. The exemplary Merge method of the present invention accomplishes the generation of two SessionKeys using two SeedKeys, each restrictively generated by a different steward, in a manner that prevents either cooperating steward from determining any information about the resulting SessionKeys since each steward has no information about the SeedKey generated by the other steward. Registrants X and Y can then use the SessionKeys to initialize a symmetric encryption algorithm to establish and authenticate secure communications. The ability of each participating registrant to successfully encrypt and decrypt the Confirmation Exchange proves that each was able to successfully encrypt and decrypt the data packets exchanged with the participating stewards, authenticating each registrant to the other.

The data packets of the messages exchanged by the registrants and stewards in FIGS. 5-8 are all encrypted in a manner such that no information about the Composite Key of any participating party is disclosed that would aid any party, participating or non-participating, in illicitly masquerading as one of the registrants or stewards. Further, the structure and parameters of the data packets within the exemplary messages allow validation and authentication of packet contents, adequately defy packet replay attacks, and effectively resist cryptanalysis attacks which may be used in an attempt to obtain useful information about SecretKeys used to encrypt message data packets containing known or predictable values.

Using an infrastructure of stewards and registrants sharing SecretKeys within their Composite Keys, the present invention enables an exchange of a sequence of messages, supported by two or more different stewards, containing encrypted data packets that securely generates and distributes a plurality of SeedKeys to a plurality of registrants wishing to communicate securely. In a particular embodiment, each SeedKey is restrictively generated by a steward independently selected and directed by one of the registrants. As previously stated, the exemplary methods employed for such restrictive generation ensure that neither cooperating party is able to unduly influence the SeedKey produced. Upon completion of its directed tasks, each steward constructs two or more data packets, one for each participating registrant. Each data packet contains a copy of the SeedKey(s), and is encrypted for a registrant party using the SecretKey that the steward shares with that registrant as determined by the steward using the corresponding SecretKey within the steward's Composite Key that is associated with the unique identifier of that registrant. Alternatively, the data packet for a directing registrant (i.e., the registrant that issued the request to the steward) may contain information (e.g. an Orderkey) which allows that registrant to reproduce the restrictive generation of the SeedKey. Again, messages and data packets may be sent directly or indirectly between stewards and registrants. After receipt of their respective data packets from all participating stewards, the two or more registrants are each then able to independently decrypt their respective data packets from the participating stewards using the SecretKey within their Composite Key which is associated with the unique identifier of the steward which constructed and encrypted the data packet for that registrant. After decrypting their respective data packets from all participating stewards, the participating registrants have all requisite SeedKeys while each steward knows only the SeedKey(s) it generated. The registrants can then combine SeedKeys from different stewards in a manner which creates new SessionKeys, SecretKeys known only to the participating registrants having the SeedKeys. Again, the exemplary Merge method of the present invention combines a pair of SeedKeys, each from a different steward, in a manner that creates two different SessionKeys which are unknown even to participating stewards. Other methods have been implemented and tested that create four or more different SessionKeys from each pair of SeedKeys, each such SessionKey also being unknown even to participating stewards. Using these SessionKeys, the participating registrants may initialize different symmetric encryption sessions to support secure communications, allowing each registrant to use one session to encrypt outgoing messages and another session to decrypt incoming messages.

It will be understood that while many applications of the present invention may involve the use of only two stewards, additional stewards may be used in any one protocol instance, each steward contributing at least one SeedKey that can be used by the participating registrants in combination with one or more SeedKeys received from other stewards to create SessionKeys using the exemplary Merge method, for example, by combining additional SeedKeys with SessionKeys generated from other SeedKeys. It will also be understood that each steward can produce and supply to each participating registrant more than one SeedKey. Thus, for example, two SeedKeys generated by each of two participating stewards may be used to produce four different pairs of SessionKeys, each pair of SessionKeys being created by using the exemplary Merge method with a different pair of SeedKeys, provided that each such SeedKey pair is comprised of only one SeedKey from a particular steward.

As previously explained, the exemplary methods of the present invention prevent any of the participating parties from unduly influencing the generation of SeedKeys and SessionKeys, and from illicitly gleaning any significant cryptanalysis information from the encrypted data packets within messages exchanged by other participating parties even though portions of the contents of data packets are known. Certainly, measures designed to effectively prevent even participating parties from gaining illicit information are assuredly even more effective against non-participants. The exemplary packet structures and encryption strategies also allow validation of packet contents and prevent packet replay attacks. Further the Composite Key protocol also addresses threats created by insider access to the Composite Key of any single steward since the protocol is designed to prevent even a participating steward from determining any information about the SessionKeys produced by a protocol instance. Said another way, as long as the Composite Key of any one of the participating stewards has not been compromised, then any SessionKey produced using a SeedKey from that steward with a SeedKey from another steward provides a secure communications session.

Embodiments of the present invention provide solutions to many challenges which are unresolved by the current state of the art of symmetric cryptography, including the ability to use only symmetric encryption to create secure communication sessions between two or more parties in a manner that authenticates each party to the other without revealing any portion of the Composite Key of any party. The methods of the present invention also provide the ability to combine multiple SeedKeys to produce multiple SessionKeys in a manner that ensures that ignorance of even a single SeedKey supplied to the exemplary Merge method to produce one or more SessionKeys adequately ensures that no information is known about any SessionKey so produced using that unknown SeedKey.

Exemplary embodiments of the present invention use packet structures and encryption strategies that allow the public exchange of encrypted data packets containing known or predictable contents in a manner that does not compromise the Composite Key of any participant. Moreover, exemplary embodiments further provide the ability to authenticate all encrypted data packets; to ensure validity of all data packet contents in a manner that prevents packet tampering and packet replay attacks; and to deny unauthorized parties access to generated SeedKeys or SessionKeys. However, it is possible for authorized parties to be provided "wiretap" access to the generated SessionKeys without compromising the Composite Key of any participant, as discussed below.

The exemplary Combine method of the present invention allows two cooperating parties, the first referred to as the directing party, and the second, as the cooperating steward, to restrictively generate a SeedKey using a strategy which ensures that neither party is able to unduly dictate results. A particular embodiment of the exemplary method employs two pseudo-randomly generated 32-byte arrays, referred to herein as a RootKey and an OrderKey. Another exemplary method, Derive, is a method used by the Combine method to selectively replace any duplicate values occurring within either of these arrays. The ordered plurality of unique values derived from the RootKey, supplied by the directing party, specifies all values that must occur within the generated SeedKey. The ordered plurality of unique values derived from the OrderKey, supplied by the cooperating steward and containing the same number of values as the RootKey, specifies the pairs of values to be exchanged within the RootKey to produce the SeedKey. The exemplary Combine method first calls upon the Derive method to selectively replace any duplicate values within the RootKey parameter to produce the initial Output parameter (the SeedKey), ensuring that the generated SeedKey will be properly constrained to have no duplicate values. Combine then calls upon the exemplary Reorder method to selectively replace all values in the OrderKey parameter with unique values in the range [0 . . . 31], and then to selectively shuffle all values within the new SeedKey in the Output parameter by exchanging adjacent pairs of unique values specified by the OrderKey. Optimally, OrderKey is an unpredictable plurality of values which are pseudo-randomly generated by the cooperating steward using a Randomize method. Thus, a registrant controls the subset of unique values that appear within the SeedKey while a steward controls only the reordering of those values. The shuffling strategy of the exemplary Reorder method used by the Combine method assures that the ordering of the values specified by a RootKey is dramatically changed since every value is always moved to a new position within the resulting SeedKey.

This illustrates only one strategy for accomplishing the goal of restrictive generation of a SeedKey, although others have been designed and tested by the inventor. For example, each of two cooperating participants could instead supply small blocks of unique values that must appear in the given order within a generated SeedKey, no two blocks contributed by either participant being allowed to occur adjacent to each other within the SeedKey. Optionally, any duplicate values within the resulting SeedKey may then be selectively replaced using a method similar to the Derive method. Other strategies may be employed, but each such strategy should ensure that neither party is able to dictate results, or even unduly influence them.

FIG. 4 illustrates an overview of an exemplary method using a sequence of messages supporting the restrictive generation and secure distribution of a pair of SeedKeys, according to one embodiment of the invention. Two cooperating registrants, X and Y, are assisted in the task by two different stewards, SX and SY, chosen by X and Y, respectively. In this exemplary method, each steward transmits two encrypted data packets within their respective response messages, one data packet encrypted using the SecretKey shared with X and the other using the SecretKey shared with Y.

Registrant X initiates the process by sending a $1^{st}$ DeriveKey Request to steward SX with a data packet containing a first RootKey, a plurality of values pseudo-randomly generated by registrant X. The data packet is encrypted by registrant X using the SecretKey shared with steward SX.

Steward SX receives the $1^{st}$ DeriveKey Request from registrant X and decrypts the data packet using the SecretKey shared with X. Steward SX then combines a first OrderKey, a plurality of values pseudo-randomly generated by steward SX, with the first RootKey, received in the data packet from registrant X, to restrictively generate a first SeedKey. Steward SX then sends a $1^{st}$ DeriveKey Response to registrant Y comprised of two encrypted data packets, each packet containing a copy of the first SeedKey. The first data packet is encrypted using the SecretKey that steward SX shares with registrant X and the second data packet is encrypted using the SecretKey that steward SX shares with registrant Y.

Registrant Y receives the $1^{st}$ DeriveKey Response from steward SX and decrypts the second data packet using the SecretKey shared with steward SX, obtaining the first SeedKey. Registrant Y then sends a $2^{nd}$ DeriveKey Request to steward SY, a steward different from steward SX. The data packet within this request contains a second RootKey, a plurality of values pseudo-randomly generated by registrant Y, which is encrypted by registrant Y using the SecretKey shared with steward SY.

Steward SY receives the $2^{nd}$ DeriveKey Request from registrant Y and decrypts the data packet using the SecretKey shared with registrant Y. Steward SY then combines a second OrderKey, a plurality of values pseudo-randomly generated by steward SY, with the second RootKey, received in the data packet from registrant Y, to restrictively generate a second SeedKey. Steward SY then sends a $2^{nd}$ DeriveKey Response to registrant X comprised of two encrypted data packets, each packet containing a copy of the second SeedKey. The first data packet is encrypted using the SecretKey that steward SY shares with registrant Y and the second data packet is encrypted using the SecretKey that steward SY shares with registrant X.

Registrant X receives the $2^{nd}$ DeriveKey Response from steward SY and decrypts the second data packet using the SecretKey shared with steward SY, thereby obtaining the second SeedKey. Registrant X then initiates a Relay Exchange in which registrants X and Y both forward the encrypted data packet each received for the other from their chosen steward, SX and SY, respectively. Registrants X and Y then each decrypt their respective packet using the SecretKey shared with SX and SY, respectively. Registrants X and Y each now have both SeedKeys.

Registrants X and Y next each independently combine the two SeedKeys using the exemplary Merge method to generate two SessionKeys, both known only to registrants X and Y, and then use the two SessionKeys to initialize two new encryption sessions. Registrant X then initiates a Confirmation Exchange in which registrant X encrypts a data packet sent to registrant Y using one of the new encryption sessions, and registrant Y encrypts a data packet sent to registrant X using the other. Each of these data packets contains a parameter known to both parties that allows the recipient to verify that the sender has used the correct encryption session to encrypt the packet. After registrants X and Y have both successfully received and decrypted an acceptable proof of confirmation within their respective data packets of the exemplary Confirmation Exchange, registrants X and Y have both been authenticated to each other and may confidently use the new encryption sessions to communicate securely. Optionally, new secondary temporary SecretKeys may be generated and exchanged within the Confirmation Packets (or within subsequent encrypted messages) which may then be used to initialize encryption sessions used to encrypt subsequent data messages.

Exemplary embodiments of the present invention use a counter, referred to herein as an InstanceCounter, which is used within encrypted data packets instead of a date/time stamp to certify to the recipient that a packet is current, where any non-current packet is deemed a replay packet to be discarded as outdated. In such exemplary embodiments, every registrant and steward maintains such an InstanceCounter within its local database. Before every message transmission to a steward, a registrant increments and records a new value of this InstanceCounter and then includes that value in an encrypted protocol data packet. Correspondingly, for every registrant, each steward maintains within its local database a recorded copy of the last InstanceCounter received from that registrant within a valid encrypted data packet. Upon receiving and decrypting a data packet from a registrant, a steward can certify the InstanceCounter within the packet by comparing it to the value of the InstanceCounter recorded in its local database for that registrant. A steward only processes data packets which contain an InstanceCounter greater than the recorded InstanceCounter for that registrant, and discards others as replay packets. The steward records each certified InstanceCounter for a registrant before performing tasks requested by the registrant.

Similarly, before every unsolicited message transmission to a registrant, (e.g., the $1^{st}$ DeriveKey Response to registrant Y in FIG. 4) every steward also increments and records a new value for its own InstanceCounter in its local database, and then includes a copy of that new InstanceCounter in an encrypted data packet for that registrant when no other InstanceCounter is present within the packet which allows the recipient to certify that a packet is current. Correspondingly, each registrant maintains a copy in its local database of the last InstanceCounter received from each steward within a valid encrypted data packet. Upon receiving and decrypting a data packet from a steward, a registrant is likewise able to identify and discard replay packets, only updating the recorded InstanceCounter for a steward when an InstanceCounter for that steward has been certified as current.

Another construct introduced within exemplary embodiments of the present invention is a protocol queue, a list of entries which each contain values associated with a protocol instance which are retained by a participating party to aid in identifying and processing appropriate responses to outstanding message requests. Every registrant and steward maintains such a queue within a local database. Each queue entry is uniquely associated with an active instance of the Composite Key protocol, and provides the set of values required to identify and process the next expected response message. Each queue entry may be uniquely identified, for example, by a header containing the InstanceCounter which was incremented and transmitted within a data packet when the queue entry was created. Alternatively, a unique Queue Entry Identifier could be generated and used which would require that this value also be included within the parameters of each appropriate data packet to allow its subsequent use within the unencrypted headers of the Relay Exchange and the Confirmation Exchange. Each active queue entry is updated as each expected request/response is received, and may be removed after the secure communications session is terminated. If no appropriate response for a queue entry occurs within a set interval, the queue entry may be purged.

As previously stated, while any strong symmetric encryption algorithm may be employed, the exemplary embodiment of the present invention uses the stream cipher methods disclosed in U.S. application Ser. No. 13/189,936, [Publication No. US 2013/0028410] incorporated by reference above. The encryption and decryption of data packets illustrated in FIGS. 5-8 may be performed using the stream cipher encryption algorithms disclosed in the '936 application (hereinafter referred to as the "stream cipher disclosure") to protect the data packet contents. As set forth in the stream cipher disclosure, three parameters are used to initialize each encryption/decryption session: (i) a SessionString, (ii) a PrivateKey, and (iii) a set of BaseKeys. The stream cipher disclosure uses the SessionString parameter to dramatically alter internal states initially created using the associated PrivateKey and BaseKeys parameters. A SessionString may be pseudo-randomly generated or constructed by using any unpredictable and/or non-recurring strings of values, such as a current date/time string concatenated with an InstanceCounter. For example, in one exemplary embodiment a SessionString is constructed by an ordered concatenation of SessionKeys. The PrivateKeys specified within the context of the stream cipher disclosure are defined as a plurality of bytes preferably containing no duplicate values. Thus, the 32-byte SecretKeys of the exemplary embodiments of the present invention which are discussed herein should be constrained to contain no duplicate values (for example, by using the Derive method) so that they meet the constraints of the PrivateKey parameter of the stream cipher disclosure. This duplicate value constraint could be imposed upon all SecretKeys within all Composite Keys, as well as upon SessionKeys produced by the protocol should a method other than the exemplary Merge method be employed. Of course, if a different symmetric encryption algorithm is selected to support the Composite Key protocols, then this constraint may not be required. The stream cipher disclosure requirement for a BaseKeys parameter could be met, for example, by creating and maintaining within the database of each participant in the Composite Key protocol an identical copy of a set of 256 SecretKeys, each containing 256 unique values in the range [0 . . . 255], as would be understood by one of ordinary skill in the art when reading and interpreting the present disclosure and the stream cipher disclosure.

The autoclave embodiment of the stream cipher disclosure includes retention of intermediate Cryptor values created during encryption (decryption) of each plaintext (ciphertext) byte. Such values are then used by the ShiftStates method called upon before encryption (decryption) of the next byte, producing significant modifications to internal states of the stream cipher disclosure in a manner that is directly influenced by the plaintext (ciphertext) being encrypted (decrypted). Thus, for example, in autoclave mode, all four bytes of ciphertext generated by encrypting the plaintext "ABCD" would be unpredictably different from the ciphertext generated by encrypting "XBCD" using the same initial internal states. Conversely, in non-autoclave mode, the last three bytes of the ciphertext produced by encrypting the two strings using the same initial internal state would be identical.

With reference to FIGS. 5-8, the exemplary request/response data packets exchanged by registrants X and Y with the two different stewards are encrypted using four different shared SecretKeys: registrant X shares SecretKey XSX with steward SX, and shares SecretKey XSY with steward SY; registrant Y shares SecretKey YSX with steward SX, and shares SecretKey YSY with steward SY. The exemplary method authenticates registrants X and Y to each other by the proven ability of each to successfully encrypt and decrypt the data packets exchanged with stewards SX and SY.

Accompanying legends are provided in FIGS. 5-8 which explain the exemplary details of each request and response message shown in FIG. 4 (actions 1-8). In particular, the legends indicate which SessionString and SecretKey combination has been used to initialize the stream cipher disclosure to encrypt and decrypt each data packet. Additionally, each illustrated request/response message is comprised of the following exemplary structure:

An unencrypted header section which supplies: (i) a code specifying the type of request/response; (ii) the identifier of the entity which encrypted the associated data packet(s); (iii) when not already known by the intended recipient, one or more SessionStrings, each used in combination with a different SecretKey to initialize the stream cipher disclosure to encrypt a data packet.

Under the unencrypted header section are one or more encrypted data packets, each having the following structure: (i) a pair of braces superscripted with the SecretKey which was used with a SessionString to initialize the stream cipher disclosure to encrypt the packet; and (ii) a pair of brackets surrounding a parameter section containing the concatenation (indicated by the symbol §) of all packet specific parameters.

The pair of braces indicates that all contents within have been encrypted by the stream cipher disclosure which was initialized using a SecretKey, indicated by the trailing superscript, in combination with a SessionString which may be either included within the unencrypted header or is implied by message type. For each encrypted data packet within a request/response message, a legend entry exists describing which specific SessionString and SecretKey has been used to initialize the encryption session.

The pair of brackets indicate the presence of two additional parameters, LEFT and RIGHT, each an identical copy of a Nonce, a plurality of byte values pseudo-randomly generated by the entity constructing the data packet. LEFT immediately precedes the parameter section and RIGHT immediately follows the parameter section. Thus, each encrypted data packet is constructed in the following prescribed manner:

1. A Nonce, a plurality of eight or more bytes, is pseudo-randomly generated;
2. A parameter section is created by concatenating all packet specific parameters;
3. A data packet is then constructed by concatenating a copy of the Nonce (LEFT), parameter section, and Nonce (RIGHT);
4. An associated SessionString is pseudo-randomly generated or, when appropriate, is constructed from parameters within previously received data packets;
5. The data packet is then encrypted using the encryption algorithm of the stream cipher disclosure operating in autoclave mode, initialized with the appropriate SessionString and a SecretKey which is indicated by the superscripted brackets.

The authorized recipient of each encrypted data packet is able to determine the appropriate SessionString and SecretKey to use to initialize an encryption session of the stream cipher disclosure to successfully decrypt the data packet within the braces. The parameter section of the decrypted packet is then validated by comparing the bracketing values LEFT and RIGHT. In autoclave mode, the encryption algorithm of the stream cipher disclosure performs in a manner such that the parameter section within the brackets may be deemed wholesome whenever LEFT and RIGHT are identical after decryption, a strong deterrent against packet tampering. Additionally, the parameter section of every data packet contains one or more parameters within the brackets which serve to authenticate the message and the message sender to the recipient.

In FIGS. 5-8, the parameters within each message header and encrypted data packet(s) are described within a legend associated with each message. Within these legends, the unique registered identifiers of registrants X and Y, who have previously agreed to establish a secure communications session, are represented by the symbols $ID_X$ and $ID_Y$, respectively. The unique identifiers of two different stewards, SX and SY, selected by registrants X and Y, respectively, are represented by $ID_{SX}$ and $ID_{SY}$, respectively. Stewards SX and SY cooperate with registrants X and Y, respectively, in the independent restrictive generation and encrypted distribution to both parties of two SeedKeys: $SK_{SX}$ represents the first SeedKey, restrictively generated by registrant X cooperating with steward SX; and $SK_{SY}$ represents the second SeedKey, restrictively generated by registrant Y cooperating with steward SY. After obtaining the two SeedKeys, registrants X and Y then each independently combines SeedKeys $SK_{SX}$ and $SK_{SY}$ using the exemplary Merge method to create two SessionKeys, XY and YX. Additionally, registrants X and Y construct two new SessionStrings, $SS_{XY}$ and $SS_{YX}$, by the ordered concatenation of XY with YX, and YX with XY, respectively (such that $SS_{XY}=XY\S YX$, and $SS_{YX}=YX\S XY$). Neither of the two stewards, SX and SY, has any knowledge of these new constructs since each steward knows only the SeedKey which it restrictively generated. Registrants X and Y then create two separate encryption sessions using the stream cipher disclosure, the first initialized with SessionString $SS_{XY}$ and SessionKey XY, and the second initialized with the SessionString $SS_{YX}$ and SessionKey YX. Each registrant uses one session to encrypt outgoing data packets and the other to decrypt incoming data packets.

The following exemplary actions describe specific parameters and related tasks associated with each request and response in the exemplary message sequence illustrated in FIGS. 5-8. Each request or response message in FIGS. 5-8 corresponds to exemplary actions 1-8 from FIG. 4 and has an accompanying legend which provides additional, exemplary descriptive details. Each encrypted data packet described within the legends of FIGS. 5-8 is created by a message sender using the packet structure previously discussed which allows the recipient of an encrypted data packet to initialize an encryption session of the stream cipher disclosure using the specified SessionString and SecretKey with a copy of the BaseKeys from within the local database as parameters; to decrypt the data packet using that encryption session; to validate the parameter section of the data packet by comparing the bracketing pair of Nonce values, LEFT and RIGHT, to ensure that they are identical; to authenticate specific data packet parameters such as InstanceCounters (which must be current), registrant identifiers (which must appear within the Composite Key of a participating steward), and SeedKeys (which must contain only unique values). For purposes of clarity and simplicity, the following discussions refer only to the fact that a data packet is encrypted (or decrypted) using a SessionString and SecretKey, which should be interpreted by the reader as indicating that a session of the stream cipher disclosure has been initialized using those parameters (in combination with the copy of the BaseKeys within each local database). Further, the tasks of validating a decrypted data packet and authenticating packet parameters are used to refer to the underscored actions described immediately above. Also note that every value required by the participating entities to perform all tasks in the following descriptions either exists within the Composite Key of the entity, or is provided within the contents of the current message, or has been retained within the protocol queue entry from previous messages. The following discussions do not address the use of a Queue Entry Identifier for Registrants X and Y, although alternative embodiments using this concept would appropriately include these values within parameters of the messages.

Figure 5:
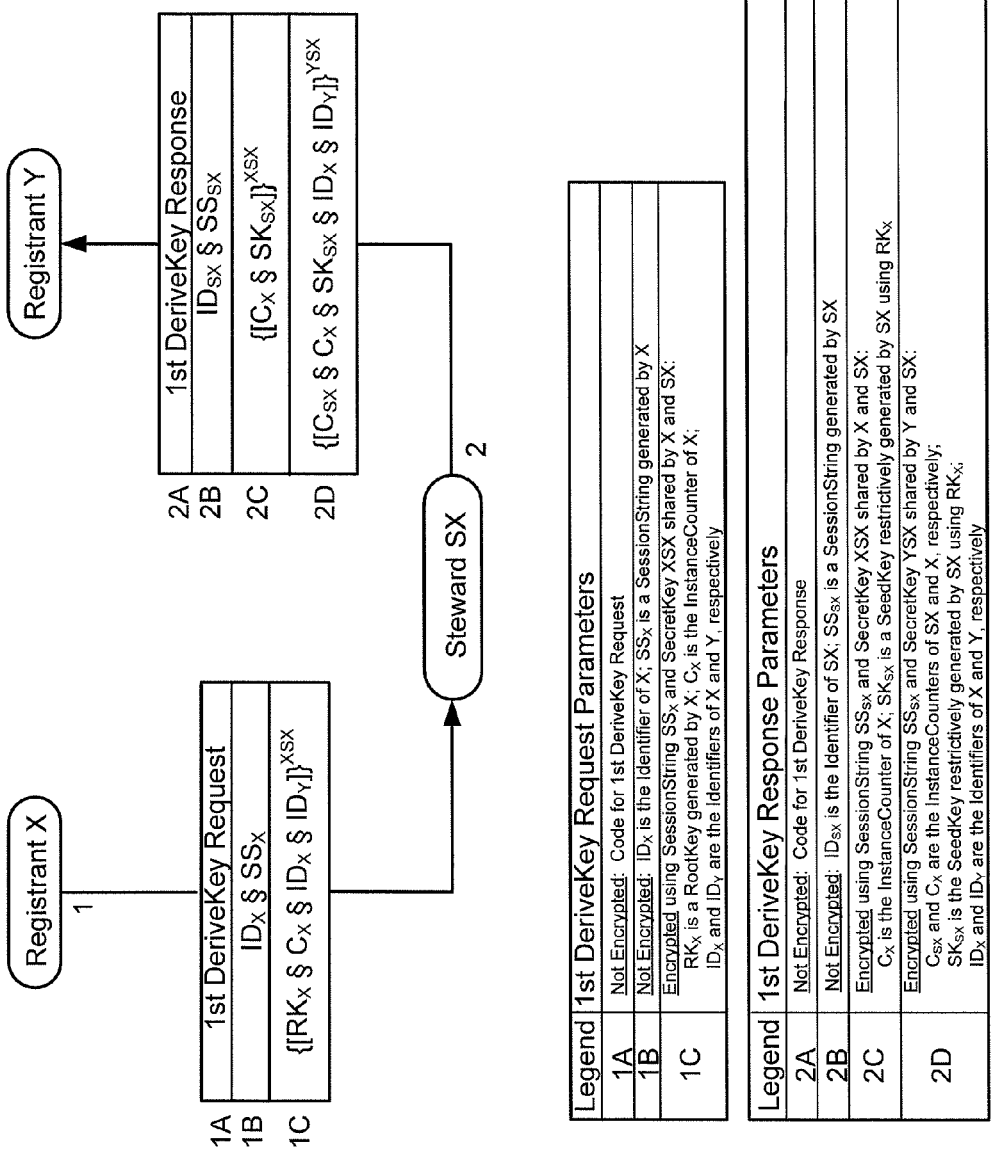
FIG. 5 illustrates the exemplary message details of the initial request and response messages in FIG. 4 between registrant X and steward SX, and between steward SX and registrant Y, according to an embodiment of the invention.

FIG. 5 shows exemplary actions 1 and 2. In action 1, registrant X initiates a protocol instance to establish secure communications with registrant Y by selecting steward SX (pseudo-randomly, automatically, or otherwise) and locating SecretKey XSX which is associated with $ID_{SX}$ within its Composite Key. Registrant X then pseudo-randomly generates SessionString $SS_X$ and RootKey $RK_X$ using Randomize. Registrant X next updates its locally maintained InstanceCounter $C_X$, and creates an appropriate queue entry in which it retains values associated with the protocol instance (e.g., InstanceCounter $C_X$, RootKey $RK_X$, SecretKey XSX, and identifiers $ID_Y$ and $ID_{SX}$) which will be required to properly perform subsequent tasks. Registrant X then builds and sends a $1^{st}$ DeriveKey Request to steward SX with an unencrypted header section and an encrypted data packet. The header section contains identifier $ID_X$ and SessionString $SS_X$. The data packet is encrypted using SessionString $SS_X$ and SecretKey XSX and contains RootKey $RK_X$, InstanceCounter $C_X$ and identifiers $ID_X$ and $ID_Y$.

Upon receiving the $1^{st}$ DeriveKey Request from registrant X, steward SX obtains identifier $ID_X$ and SessionString $SS_X$ from the unencrypted header section and decrypts the data packet using SessionString $S_X$ and SecretKey XSX (associated with identifier $ID_X$ within the Composite Key of steward SX). Steward SX next validates the data packet and authenticates packet parameters (e.g., InstanceCounter $C_X$ and identifiers $ID_X$ and $ID_Y$). Steward SX then records $C_X$ in association with registrant X.

In action 2, steward SX first pseudo-randomly generates SessionString $SS_{SX}$ and OrderKey $OK_{SX}$ using Randomize. Steward SX then restrictively generates SeedKey $SK_{SX}$ by using the exemplary Combine method with RootKey $RK_X$ (received in the data packet sent by registrant X) and OrderKey $OK_{SX}$. Steward SX next locates identifier $ID_Y$ within its Composite Key to obtain SecretKey YSX; updates its locally maintained InstanceCounter $C_{SX}$; and then builds and sends a $1^{st}$ DeriveKey Response to registrant Y containing an unencrypted header section and two encrypted data packets. The header section contains identifier $ID_{SX}$ and SessionString $SS_{SX}$. The first data packet is encrypted using SessionString $SS_{SX}$ and SecretKey XSX and contains InstanceCounter $C_X$ and SeedKey $SK_{SX}$. The second data packet is encrypted using SessionString $SS_{SX}$ and SecretKey YSX and contains InstanceCounters $C_{SX}$ and $C_X$, SeedKey $SK_{SX}$, and identifiers $ID_X$ and $ID_Y$.

Upon receiving the $1^{st}$ DeriveKey Response from steward SX, registrant Y obtains $ID_{SX}$ and SessionString $SS_{SX}$ from the unencrypted header section, and uses SessionString $SS_{SX}$ and SecretKey YSX (associated with the identifier $ID_{SX}$ within the Composite Key of registrant Y) to decrypt the second data packet. Registrant Y next validates the second data packet and authenticates packet parameters (e.g., InstanceCounter $C_{SX}$ and identifier $ID_Y$). Registrant Y then records InstanceCounter $C_{SX}$ in association with steward SX.

Figure 6:
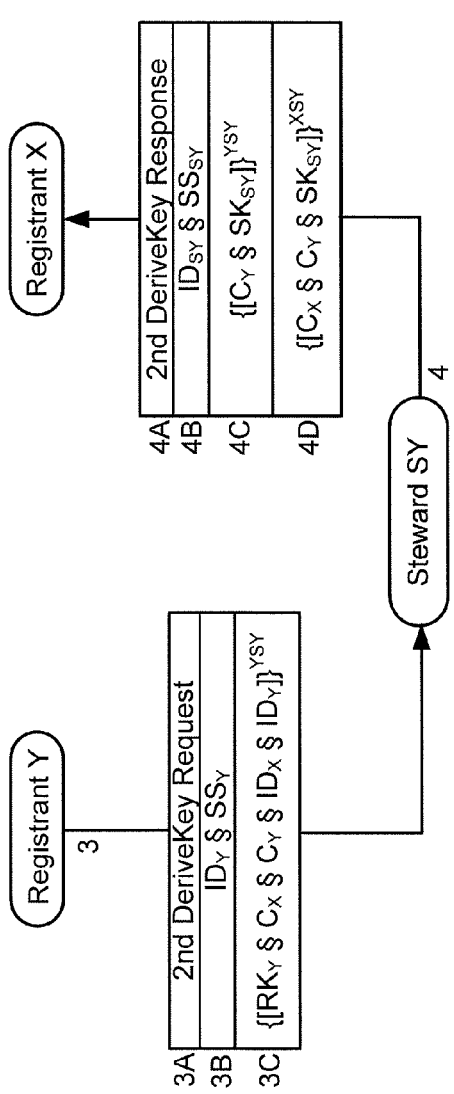
FIG. 6 illustrates exemplary message details of the secondary request and response messages in FIG. 4 between registrant Y and steward SY, and between steward SY and registrant X, according to an embodiment of the invention.

FIG. 6 shows exemplary actions 3 and 4. In action 3, registrant Y selects steward SY (pseudo-randomly, automatically, or otherwise), a different steward from SX, and pseudo-randomly generates SessionString $SS_Y$ and RootKey $RK_Y$ using Randomize. Registrant Y next updates its locally maintained InstanceCounter $C_Y$ and creates an appropriate queue entry in which it retains values associated with the protocol instance (e.g., InstanceCounters $C_X$ and $C_Y$, the first encrypted data packet received from steward SX, RootKey $RK_Y$, SeedKey $SK_{SX}$, etc.) which will be required to properly perform subsequent tasks. Registrant Y then builds and sends a $2^{nd}$ DeriveKey Request to steward SY with an unencrypted header section and an encrypted data packet. The header section contains identifier $ID_Y$ and SessionString $SS_Y$. The data packet is encrypted using SessionString $SS_Y$ and SecretKey YSY and contains RootKey $RK_Y$, InstanceCounters $C_X$ and $C_Y$, and identifiers $ID_X$ and $ID_Y$.

Steward SY, upon receiving the $2^{nd}$ DeriveKey Request from registrant Y, obtains identifier $ID_Y$ and SessionString $SS_Y$ from the unencrypted header section and decrypts the data packet using SessionString $SS_Y$ and SecretKey YSY (associated with identifier $ID_Y$ within the Composite Key of steward SY). Steward SY next validates the data packet and authenticates packet parameters (e.g., InstanceCounter $C_Y$, and identifiers $ID_X$ and $ID_Y$). Steward SY then records InstanceCounter $C_Y$ in association with registrant Y.

In action 4, steward SY first pseudo-randomly generates SessionString $SS_{SY}$ and OrderKey $OK_{SY}$ using Randomize. Steward SY then restrictively generates SeedKey $SK_{SY}$ by using the exemplary Combine method with RootKey $RK_Y$ (received in the data packet sent by registrant Y) and OrderKey $OK_{SY}$. Steward SY then builds and sends a $2^{nd}$ DeriveKey Response to registrant X containing an unencrypted header section and two encrypted data packets. The header section contains identifier $ID_{SY}$ and SessionString $SS_{SY}$. The first data packet is encrypted using SessionString $SS_{SY}$ and SecretKey YSY and contains InstanceCounter $C_Y$ and SeedKey $SK_{SY}$. The second data packet is encrypted using SessionString $SS_{SY}$ and SecretKey XSY (from the Composite Key of steward SY) and contains InstanceCounters $C_X$ and $C_Y$ and SeedKey $SK_{SY}$.

Upon receiving the $2^{nd}$ DeriveKey Response from steward SY, registrant X obtains identifier $ID_{SY}$ and SessionString $SS_{SY}$ from the unencrypted header section and decrypts the second data packet using SessionString $SS_{SY}$ and SecretKey XSY (associated with identifier $ID_{SY}$ within the Composite Key of registrant X), and then validates the packet. Registrant X next authenticates the packet by confirming that an appropriate queue entry exists which contains packet parameter $C_X$ and then updates the queue entry by including within it, for example, InstanceCounter $C_Y$ and SeedKey $SK_{SY}$.

Figure 7:
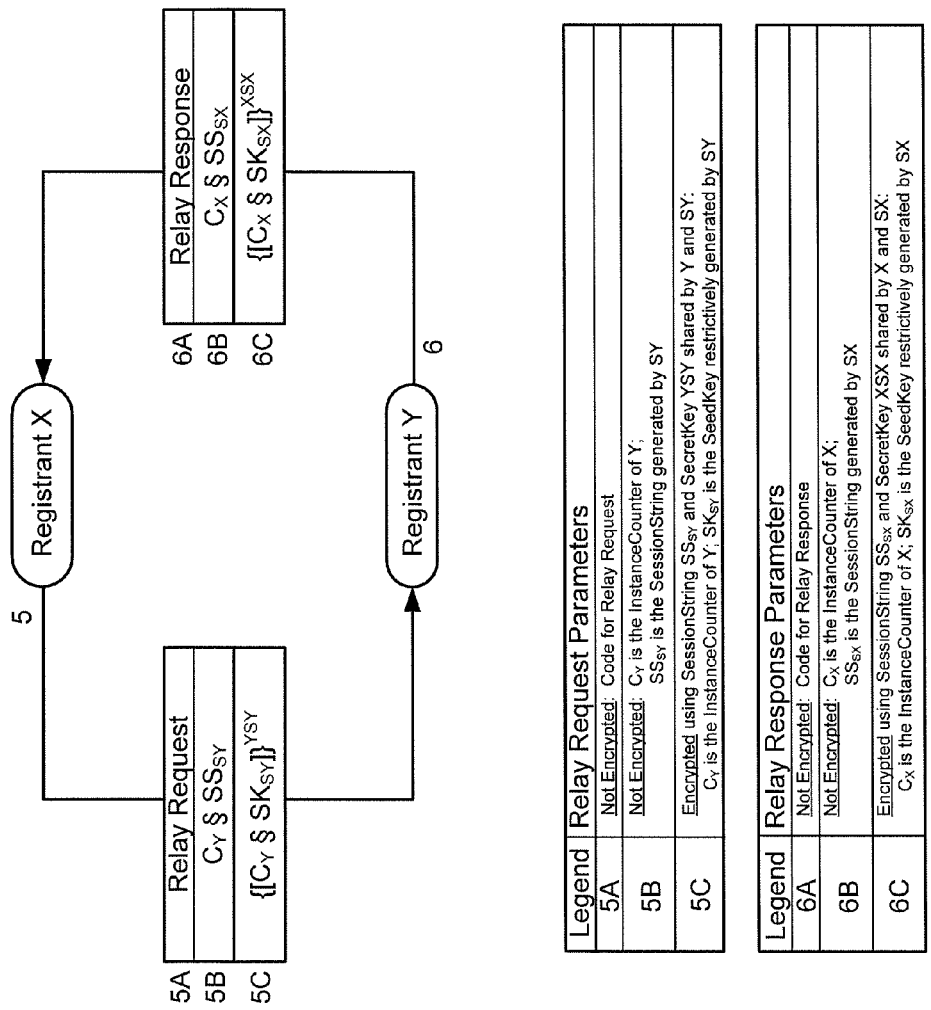
FIG. 7 illustrates exemplary message details of the request and response messages exchanged by registrants X and Y in FIG. 4 in which X and Y each forward an encrypted message each received from a steward for the other, according to an embodiment of the invention.

FIG. 7 shows exemplary actions 5 and 6. In action 5, registrant X builds and sends a Relay Request to registrant Y that includes an unencrypted header section containing InstanceCounter $C_Y$ and SessionString $SS_{SY}$, and an encrypted data packet which is a copy of the first encrypted data packet that X received within the $2^{nd}$ DeriveKey Response from steward SY.

Upon receiving the Relay Request from registrant X, registrant Y obtains InstanceCounter $C_Y$ and SessionString $SS_{SY}$ from the unencrypted header section and confirms that a valid queue entry exists which contains InstanceCounter $C_Y$. Registrant Y then decrypts the data packet using SessionString $SS_{SY}$ and SecretKey YSY (either from the protocol queue entry associated with $C_Y$ or from its Composite Key) and validates the packet. Registrant Y then authenticates the data packet using the decrypted value of packet parameter $C_Y$ which must be identical to parameter $C_Y$ in the header section. Registrant Y next verifies that SeedKey $SK_{SY}$ was restrictively generated from RootKey $RK_Y$ (also obtained from the protocol queue entry). Registrant Y then uses the exemplary Merge method with SeedKey $SK_{SX}$ (also from the queue entry for Cy) and SeedKey $SK_{SY}$ to create SessionKeys XY and YX and next constructs SessionString $SS_{XY}$ by concatenating SessionKeys XY with YX and SessionString $SS_{YX}$ by concatenating SessionKeys YX with XY, and retains these values in the protocol queue.

In action 6, registrant Y builds and sends a Relay Response to registrant X which includes an unencrypted header section containing InstanceCounter $C_X$ and SessionString $SS_{SX}$, and an encrypted data packet which is a copy of the first encrypted data packet that registrant Y received within the $1^{st}$ DeriveKey Response from steward SX, all having been retained within the protocol queue entry with InstanceCounter Cy.

Upon receiving the Relay Response from registrant Y, registrant X obtains InstanceCounter $C_X$ and SessionString $SS_{SX}$ from the unencrypted header section and confirms that a valid queue entry exists for InstanceCounter $C_X$. Registrant X then decrypts the data packet using SessionString $SS_{SX}$ and SecretKey XSX (from the protocol queue entry associated with $C_X$ or from its Composite Key) and validates the packet. Registrant X next authenticates the packet using the decrypted value of packet parameter $C_X$ which must be identical to parameter $C_X$ in the header section. Registrant X next verifies that SeedKey $SK_{SX}$ was restrictively generated from RootKey $RK_X$ (also from the protocol queue entry for $C_X$). Registrant X then uses the exemplary Merge method with SeedKey $SK_{SX}$ and SeedKey $SK_{SY}$ from the protocol queue to create SessionKeys XY and YX and next constructs SessionString $SS_{XY}$ by concatenating SessionKeys XY with YX and SessionString $SS_{YX}$ by concatenating SessionKeys YX with XY, and retains these values in the protocol queue.

Figure 8:
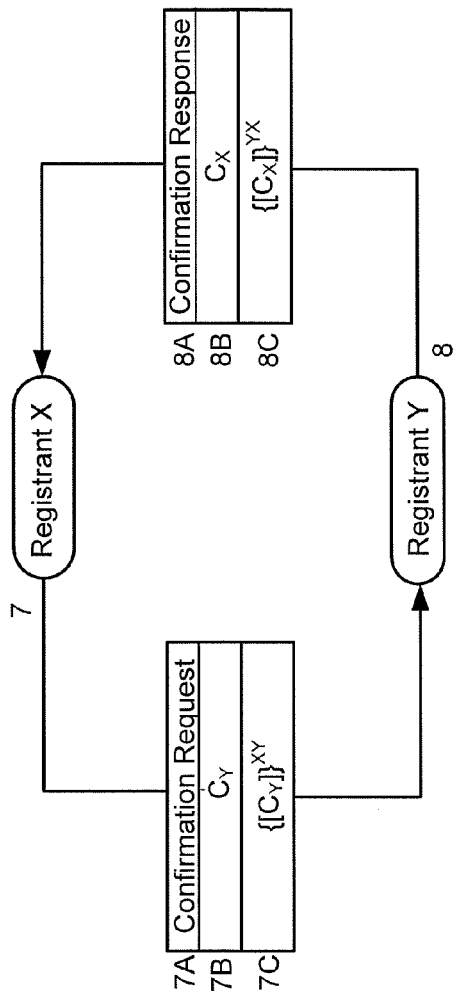
FIG. 8 illustrates exemplary message details of the request and response messages exchanged by registrants X and Y in FIG. 4 which confirms the successful creation of a secure communications session between registrants X and Y, and which also authenticates each to the other, according to an embodiment of the invention.

FIG. 8 shows exemplary actions 7 and 8. In action 7, registrant X builds and sends a Confirmation Request to registrant Y with an unencrypted header section containing InstanceCounter $C_Y$ and a data packet, also containing InstanceCounter $C_Y$, which is encrypted using SessionString $SS_{XY}$ and SecretKey XY.

Upon receiving the Confirmation Request from registrant X, registrant Y confirms that a valid protocol queue entry exists for InstanceCounter $C_Y$ in the unencrypted header section and then decrypts and validates the data packet using SessionString $SS_{XY}$ and SecretKey XY obtained from the protocol queue. Registrant Y then authenticates the packet using the decrypted value of packet parameter $C_Y$, which must be identical to parameter $C_Y$ in the header section.

In action 8, registrant Y builds and sends a Confirmation Response to registrant X having an unencrypted header section containing InstanceCounter $C_X$ and a data packet, which also contains InstanceCounter $C_X$, which is encrypted using SessionString $SS_{YX}$ and SecretKey YX obtained from the protocol queue.

Upon receiving the Confirmation Response from registrant Y, registrant X confirms that a valid queue entry exists for InstanceCounter $C_X$ in the unencrypted header section and decrypts the data packet using SessionString $SS_{YX}$ and SecretKey YX obtained from the protocol queue and validates the packet. Registrant X then authenticates the packet using the decrypted value of packet parameter $C_X$, which must be identical to parameter $C_X$ in the header section.

In this exemplary manner, the illustrated data packets exchanged by registrants X and Y with two different stewards SX and SY, must be successfully encrypted and decrypted by each registrant using the SecretKey shared by that registrant with each steward to construct identical SessionKeys and SessionStrings required to successfully encrypt and decrypt the data packets of the Confirmation Exchange illustrated in FIG. 8. The successful completion of the Confirmation Exchange authenticates registrants X and Y to each other as it proves that each is able to successfully encrypt and decrypt their respective confirmation packets as well as the data packets exchanged with the two stewards, and also confirms that each steward successfully authenticated and accepted the InstanceCounter of a different registrant as being valid (i.e., greater than the last recorded InstanceCounter previously received from that registrant).

The contents of the encrypted data packets within the Confirmation Exchange may in practice be any value known to both parties (e.g. the first 8 bytes of a SeedKey). The exemplary embodiment includes a copy of the InstanceCounters within the unencrypted headers and the encrypted data packets of the Relay Exchange and Confirmation Exchange messages to allow the message recipient to identify the associated protocol queue entry. As discussed above, a unique Queue Entry Identifier may be introduced and used instead of the InstanceCounters within the unencrypted headers of the Relay Exchange and Confirmation Exchange to uniquely identify the queue entry of each registrant without revealing any InstanceCounter values within unencrypted headers or within encrypted data packets received by other registrants.

Optionally, actions 1-4 could be repeated with a second pair (or more) of stewards to generate additional SeedKeys which could then be used to alter the contents of SessionKeys XY and YX and, optionally, the associated SessionStrings. The Relay Exchange between registrants X and Y (actions 5 and 6) would then include the exchange of additional data packets containing one or more SeedKeys to each party, each data packet having been generated and encrypted for that party by a different steward which restrictively generated the SeedKey(s). Incorporating the participation of additional SeedKeys from different stewards significantly increases protection against threats raised by insider access to databases of stewards since the databases of all participating stewards must be compromised to allow illicit access to the generated SessionKeys. Adopting a policy requiring registrants to periodically update the shared SecretKeys within their Composite Key would further increase protection against even such remote threats.

Using the exemplary embodiment, any registrant may simultaneously cooperate in multiple Composite Key protocol instances since each registrant is able to uniquely identify active queue entries associated with every valid response message using the associated InstanceCounter (or optionally, a unique Queue Entry Identifier). After each secure communications session has been successfully established, the two cooperating registrants may incorporate packet numbers within their subsequent encrypted data packets, still using their InstanceCounters (or optionally, their Queue Entry Identifiers) to link subsequent data packets with a particular communications session.

Further, it should be noted that the number of messages exchanged may be reduced by various strategies which incorporate pass-through data packets or other shortcut strategies. For example, the Relay Response message could also contain a Confirmation Request data packet since Registrant Y already knows both SeedKeys at that point, and Registrant X could then issue the Confirmation Response. While such strategies would possibly be more efficient to implement, the exemplary messages in actions 1-8 discussed above all have a corresponding response for each request, making the process sequential and more readily understood. However, the number of messages and associated data packets may readily be changed, as would be understood by one of ordinary skill in the art after reading the present disclosure. The crux of the matter is that the present invention provides a secure method using two (or more) SecretKeys within the Composite Keys of two (or more) registrants, each SecretKey shared with one of two (or more) stewards, and each SecretKey being used to initialize a symmetric encryption algorithm to encrypt and decrypt secret packet parameters exchanged by a registrant and a steward.

Alternative Protocol Embodiments

The exemplary embodiment illustrated in FIGS. 4-8 includes the task of "restrictive generation" in which each cooperating steward reorders values specified by a RootKey to restrictively generate a SeedKey. This strategy ensures that no participant, registrant or steward, is able to unduly dictate the SeedKeys or the SessionKeys produced by a protocol instance and that neither cooperating steward is able to determine any information about the generated SessionKeys. However, such a strategy imposes the necessity having each cooperating steward provide the directing party a copy of the restrictively generated SeedKey within a separate data packet encrypted for that registrant. These encrypted data packets, the first encrypted data packet within each DeriveKey Response illustrated in FIG. 5 and FIG. 6, are subsequently exchanged by the participating registrants using the Relay Request and Relay Response messages described in FIG. 7. An alternative embodiment eliminates the need for both of these encrypted data packets and, consequently, eliminates the Relay Exchange messages.

Figure 9:
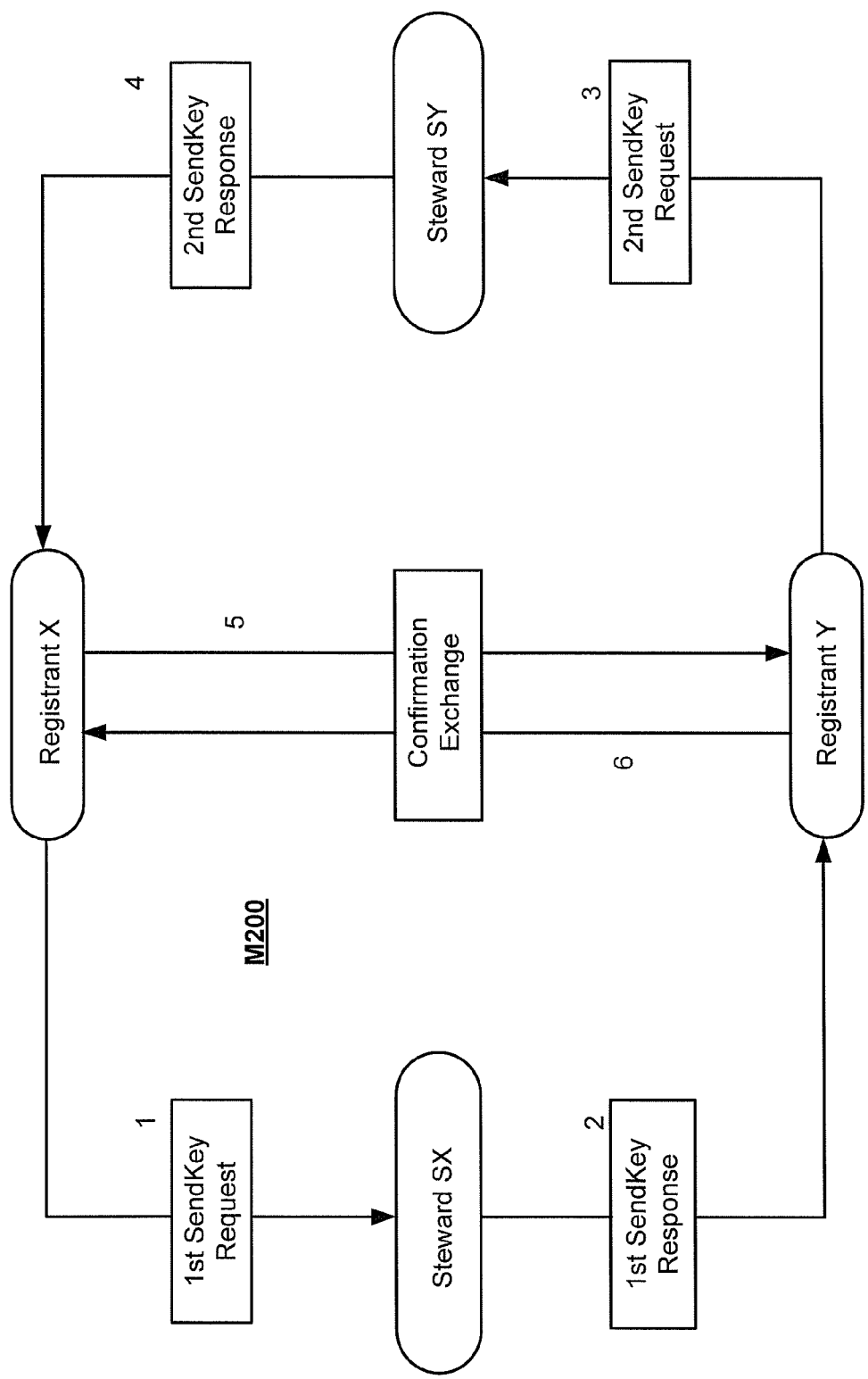
FIG. 9 illustrates an exemplary method of an alternative embodiment in which SX and SY, two different stewards, each a member of a plurality of trusted third parties 114, cooperate in a logical sequence of messages to establish a secure communications session between X and Y, two different registrants, each a member of a plurality of entities 112, which also authenticates each registrant to the other, according to an embodiment of the invention.

A method M200 according to such an alternative embodiment is presented in FIG. 9 which illustrates a sequence of messages (1-6) supporting a protocol instance in which the stewards do not reorder values within the SeedKeys. Instead, as illustrated in the packet details in FIGS. 10-12, two communicating parties, registrants X and Y, use two different trusted parties, stewards SX and SY, to securely exchange two SeedKeys, the first generated by registrant X and the second generated by registrant Y. The first SeedKey specifies a set of unique values, each of which may appear once, and only once, within two SessionKeys, XY and YX, to be generated by the protocol instance. The second SeedKey specifies the reordering of the values specified by the first SeedKey, determining which values will appear within each SessionKey and also determining the ordering of those values within each SessionKey. The two SessionKeys are then concatenated in alternating order to construct two SessionStrings, $SS_{XY}$ and $SS_{YX}$. Thus, $SS_{XY}$=XY§YX, and $SS_{YX}$=YX§XY. Two separate encryption sessions of the stream cipher disclosure can then be initialized and used to establish direct secure two-way communications, one session initialized using SessionString $SS_{XY}$ and SessionKey XY, and the other session initialized using SessionString $SS_{YX}$ and SessionKey YX.

In the following descriptions, it is assumed that each of the SeedKeys contains at least twice the number of values required for a SessionKey. Alternatively, the SeedKeys may each contain the same number of values as a SessionKey, in which case each may be used as an input for repeatedly calling the exemplary Derive method (without clearing the FLAGS array after the first call) to generate two or more SecretKeys which may then be concatenated to produce the requisite sized SeedKey containing no duplicate values. Ideally, the set of unique values specified by such a generated SeedKey should exceed the number of values required to construct two SessionKeys. This strategy assures that the first steward, SX in the illustrated example, would be unable to determine which values appear within the SessionKeys, although it may be able to determine which values do not appear. Optionally, such concerns could be addressed by using the exemplary Merge method to combine the generated SessionKeys with the original SeedKeys, or values derived from those SeedKeys using the exemplary Derive method.

Figure 10:
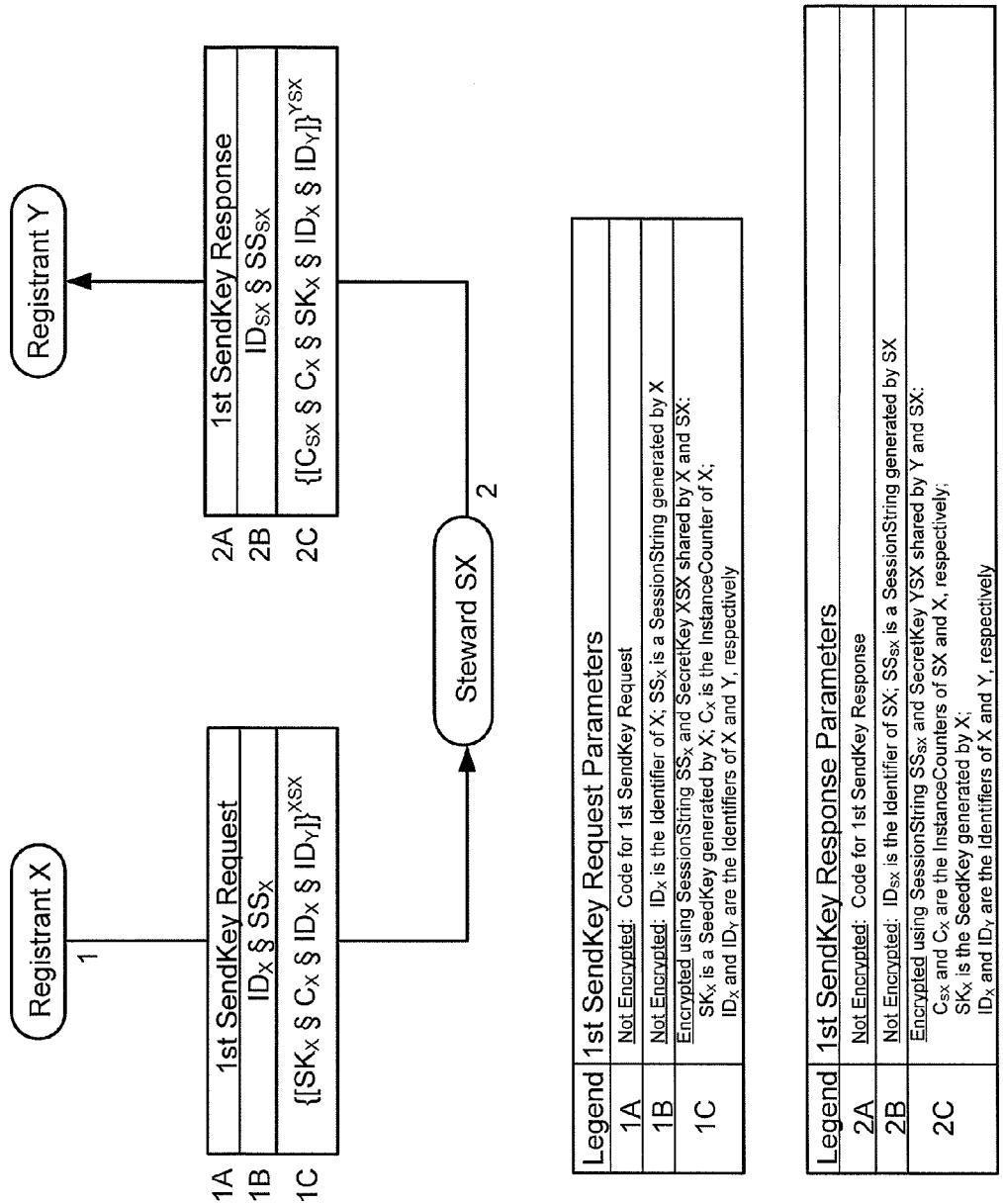
FIG. 10 illustrates the exemplary message details of the initial request and response messages in FIG. 9 between registrant X and steward SX, and between steward SX and registrant Y, according to an embodiment of the invention.

In the actions illustrated in FIG. 10, Registrant X uses steward SX to securely transmit SeedKey $SK_X$ to registrant Y via the $1^{st}$ SendKey Request/Response messages. Registrant Y obtains the first SeedKey $SK_X$ within the $1^{st}$ SendKey Response received from steward SX and generates SeedKey $SK_Y$. Registrant Y then performs a Reorder of SeedKey $SK_X$ using SeedKey $SK_Y$ to create SeedKey $SK_{XY}$ which in effect comprises the concatenation of SessionKeys XY and YX (plus additional values, optionally). Thus, SessionKey XY is within the first portion of SeedKey $SK_{XY}$, and SessionKey YX is within a second portion (immediate following the first portion) of SeedKey $SK_{XY}$. Registrant Y next constructs the two SessionStrings $SS_{XY}$ and $SS_{YX}$ by alternately concatenating the SessionKeys, XY with YX, and YX with XY, respectively.

Figure 11:
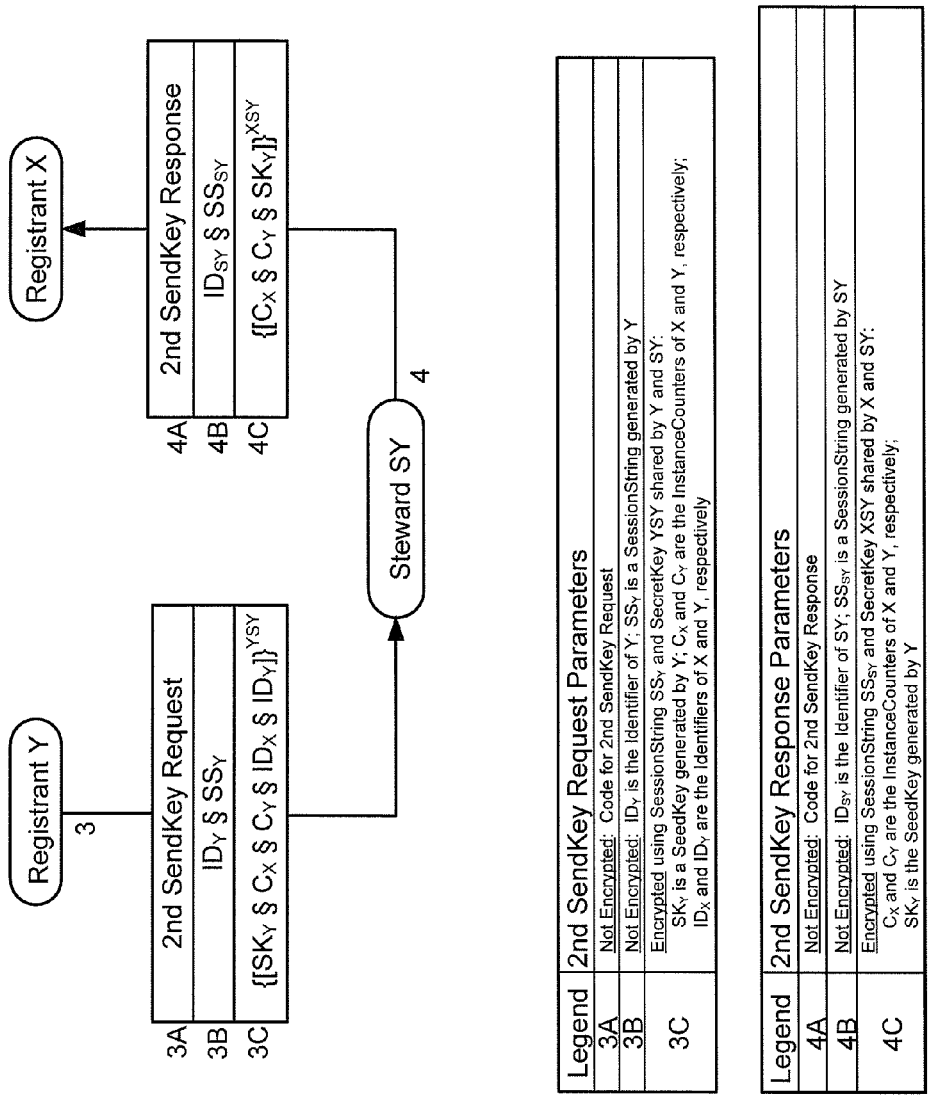
FIG. 11 illustrates exemplary message details of the secondary request and response messages in FIG. 9 between registrant Y and steward SY, and between steward SY and registrant X, according to an embodiment of the invention.

In the actions illustrated in FIG. 11, registrant Y sends SeedKey $SK_Y$ to registrant X within the $2^{nd}$ SendKey Request/Response sent via steward SY. Registrant X, upon receiving the $2^{nd}$ SendKey Response from steward SY, obtains SeedKey $SK_Y$ and is likewise able to create SeedKey $SK_{XY}$ and extract SessionKeys XY and YX and then construct SessionStrings $SS_{XY}$ and $SS_{XY}$.

Figure 12:
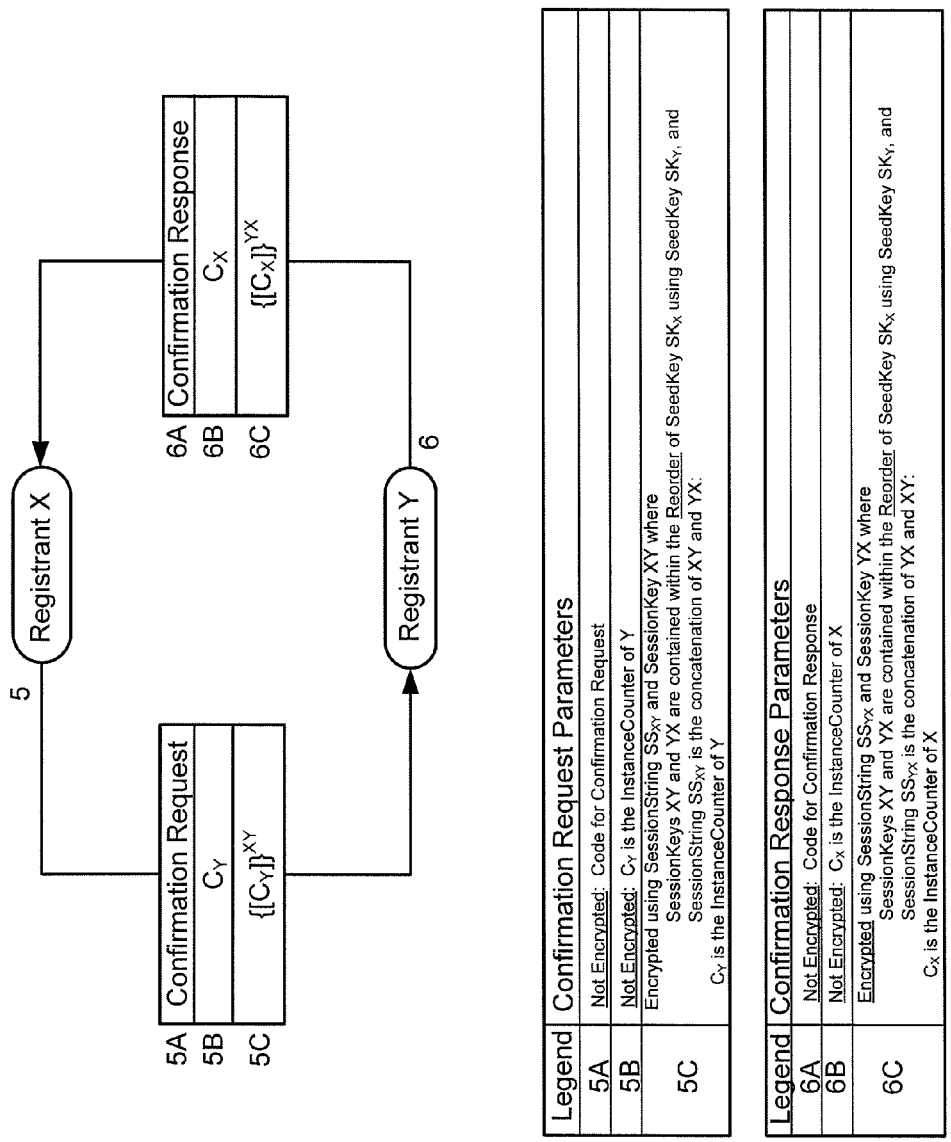
FIG. 12 illustrates exemplary message details of the request and response messages exchanged by registrants X and Y in FIG. 9 which confirms the successful creation of a secure communications session between registrants X and Y, and which also authenticates each to the other, according to an embodiment of the invention.

In the actions illustrated in FIG. 12, registrant X sends a Confirmation Request to registrant Y containing InstanceCounter $C_Y$ in a data packet encrypted using SessionString $SS_{XY}$ and SessionKey XY. Registrant Y authenticates the Confirmation Request, and then completes the protocol message sequence by sending a Confirmation Response to registrant X containing InstanceCounter $C_X$ in a data packet encrypted using SessionString $SS_{YX}$ and SessionKey YX. Again, the successful completion of the Confirmation Exchange authenticates registrants X and Y to each other as each has proven the ability to successfully encrypt and decrypt messages exchanged with both stewards SX and SY, and further assures that each steward successfully authenticated and accepted the InstanceCounter of a different registrant as being valid (i.e., greater than the last recorded InstanceCounter previously received from that registrant).

Thus, in the alternative embodiment, the role of the each steward becomes only that of an intermediary supporting the secure exchange of SeedKeys within encrypted data packets, each SeedKey being sent by one of the communicating parties to the other communicating party via a different steward. This alternative embodiment prevents either communicating party from unduly dictating the generated SessionKeys and also prevents any cooperating steward from determining significant information about the generated SessionKeys. For example, when used to generate SessionKeys which each contain 32 bytes, 96 unique values specified by (or derived from) the first SeedKey may be reordered by 96 unique values specified by (or derived from) the second SeedKey to unpredictably produce any one of the more than $10^{114}$ different orderings (96 factorial divided by 32 factorial), each such ordering producing a different pair of SessionKeys and associated SessionStrings. Optionally, new secondary temporary SecretKeys may be generated and exchanged within the Confirmation Packets (or within subsequent encrypted messages) which may then be used to initialize encryption sessions used to encrypt subsequent data messages to further protect communications from the participating stewards.

The messages and the corresponding data packets associated with this alternative embodiment illustrated in FIGS. 10-12 are provided without further descriptions of encryption and decryption of data packets, or data packet details, other than the legends within these figures. Such information would be inferred and understood by one of ordinary skill in the art who is familiar with the discussions of the previous embodiment. As in the previous embodiment, additional stewards and/or communicating parties may participate in any protocol instance of this alternative embodiment.

Figure 13:
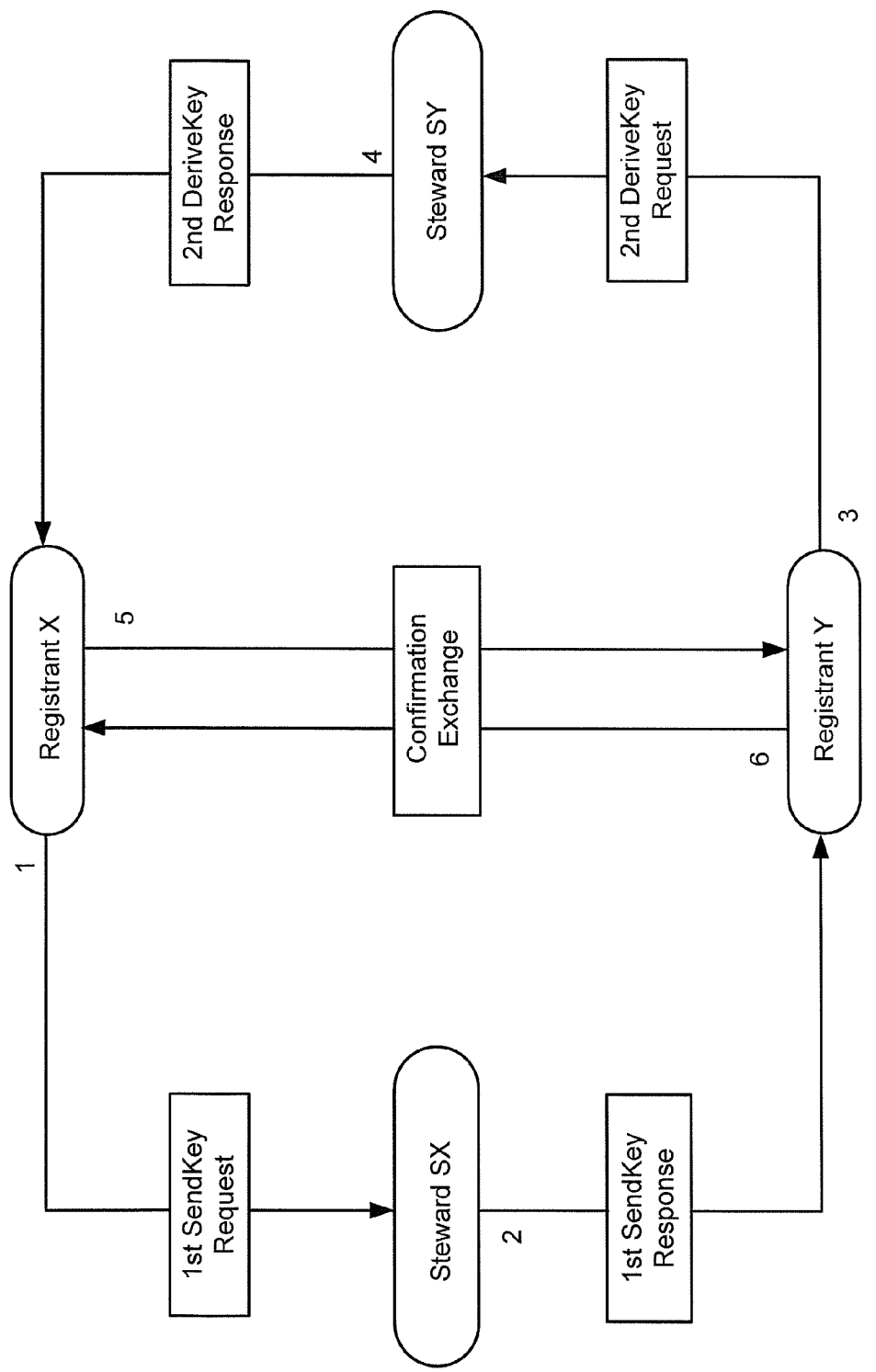
FIG. 13 illustrates an exemplary method of a hybrid alternative embodiment in which SX and SY, two different stewards, each a member of a plurality of trusted third parties 114, cooperate in a logical sequence of messages to establish a secure communications session between X and Y, two different registrants, each a member of a plurality of entities 112, which also authenticates each registrant to the other, according to an embodiment of the invention.
Figure 14:
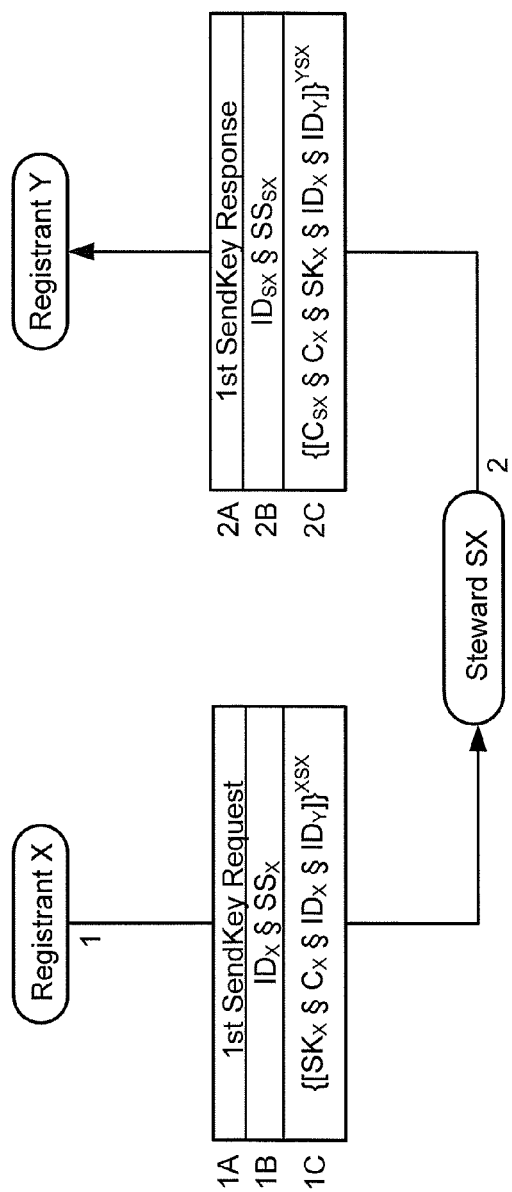
FIG. 14 illustrates the exemplary message details of the initial request and response messages in FIG. 13 between registrant X and steward SX, and between steward SX and registrant Y, according to an embodiment of the invention.
Figure 15:
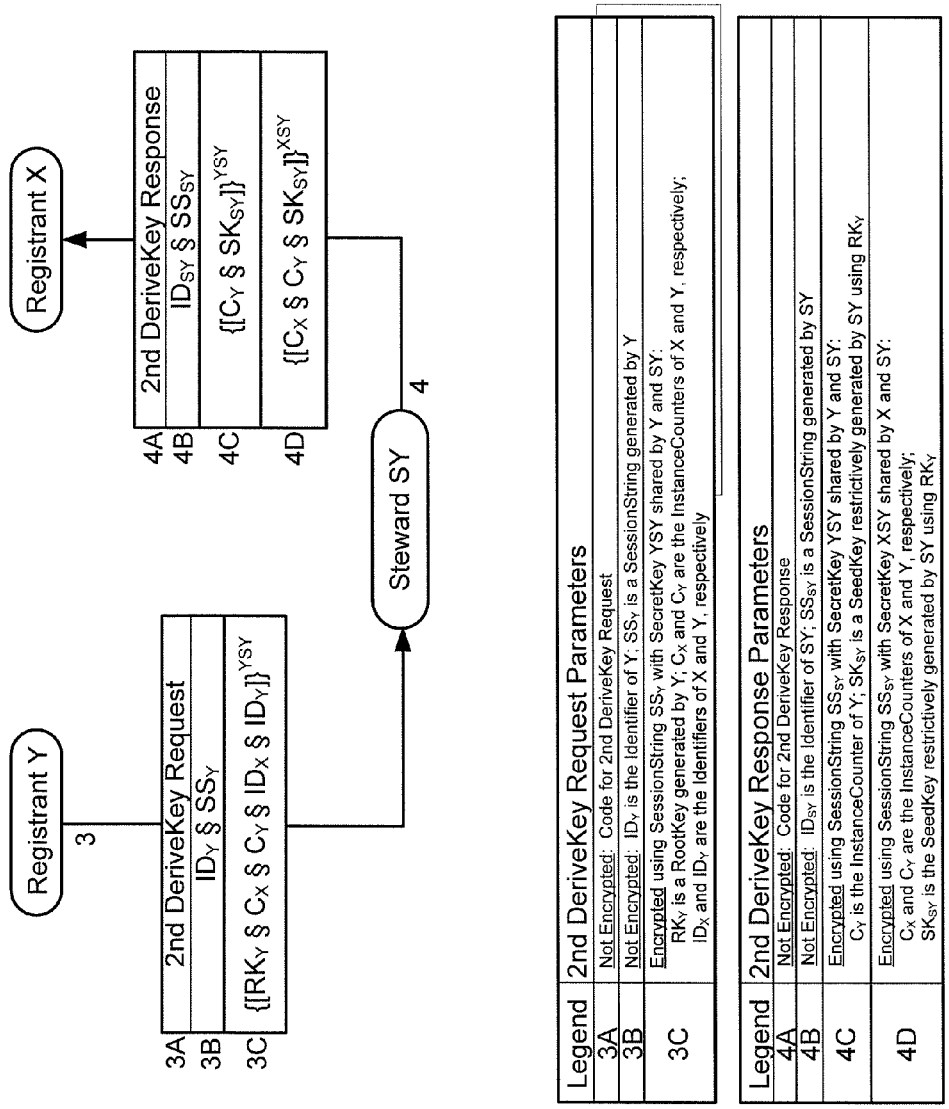
FIG. 15 illustrates exemplary message details of the secondary request and response messages in FIG. 13 between registrant Y and steward SY, and between steward SY and registrant X, according to an embodiment of the invention.
Figure 16:
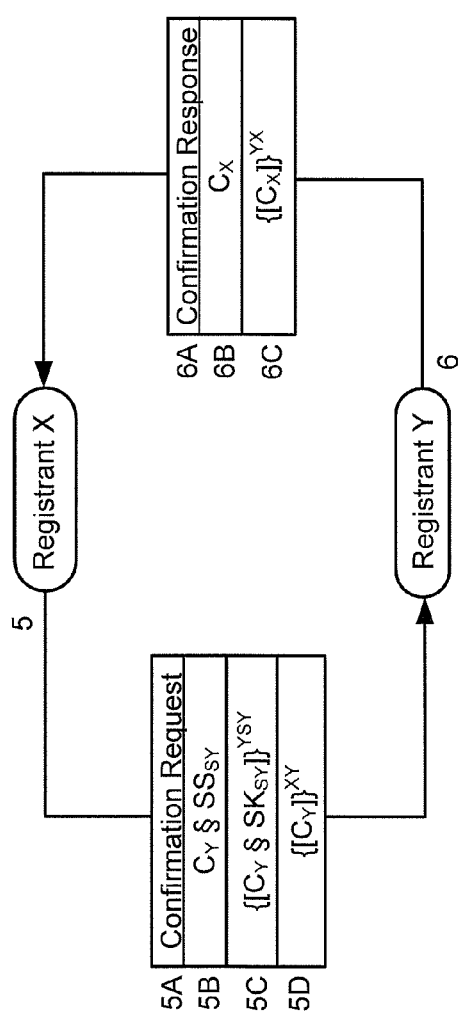
FIG. 16 illustrates exemplary message details of the request and response messages exchanged by registrants X and Y in FIG. 13 which confirms successful creation of a secure communications session between registrants X and Y, and which also authenticates each to the other, according to an embodiment of the invention.

Another exemplary method, a hybrid alternative embodiment, is presented which introduces a sequence of messages that represents a compromise between the other two exemplary embodiments. This hybrid embodiment also prevents even a cooperating steward from determining any information about the SessionKeys and SessionStrings produced and also prevents either communicating party from unduly influencing their creation. Actions 1-6 of a method M300 according to such a hybrid embodiment are illustrated in FIG. 13. In this embodiment, the second communicating party, registrant Y in this example, issues a $2^{nd}$ DeriveKey Request (action 3) to steward SY, the second steward, rather than a $2^{nd}$ SendKey Request as performed within the alternative embodiment presented in FIG. 9. Thus, an encrypted data packet from steward SY containing a restrictively generated SeedKey, $SK_{SY}$, is included for registrant Y as it is in the previous embodiment. This strategy allows registrant X to include the encrypted data packet for registrant Y from steward SY containing SeedKey $SK_{SY}$ within the Confirmation Request message. SeedKey $SK_X$ and SeedKey $SK_{SY}$ can then be independently merged by registrants X and Y to create SessionKeys and SessionStrings as in the previous embodiment. The messages 1-6 and the corresponding data packets associated with this hybrid alternative embodiment are illustrated in FIGS. 14-16. Again, no additional descriptions are provided since the purpose of the messages and packet parameters would be understood by one of ordinary skill in the art who is familiar with the previous embodiment.

Authorized Wiretaps Strategy

In one exemplary aspect of the invention, authorized "wiretaps" may be established for all secure communication sessions involving a specific registrant without revealing any portion of the registrant's Composite Key. This could be accomplished by introducing a special registered identity that represents a Wiretap Authority, such as a FISA Court (established by the Foreign Intelligence Surveillance Act). The Wiretap Authority could create and maintain a Wiretap List, a list of the identifiers of registrants for whom wiretaps have been legally authorized, each list entry also specifying the identifier of a registrant authorized to perform the wiretap (e.g., an FBI workstation) and, optionally, an expiration date. The Wiretap Authority could then provide a current copy of this Wiretap List to all stewards, using an instance of the Composite Key protocol to establish a secure communications session with each steward. Whenever a protocol instance establishes a secure communication session for a registrant within the current Wiretap List, each steward cooperating in the protocol instance would automatically transmit any SeedKey information to the authorized Wiretap workstation using a separate secure communications session established by another protocol instance, allowing the authorized wiretap office to construct the SessionKeys and SessionStrings ultimately employed by that registrant for each secure communications session. However, it is essential that wiretaps only be established for secure communication sessions between two or more registrants in a manner that ensures that no portion of a Composite Key is compromised by such a wiretap.

Exemplary Applications

One exemplary application of the present invention supports document authentication. Identity assurance is a major impediment when using conventional symmetric cryptography to authenticate documents using digital signatures since any two parties who share a SecretKey are cryptographically indistinguishable from each other. Expressed another way, either party is able to masquerade as the other in producing a digital signature. The innovative concept of a Composite Key resolves this problem since only the registrant knows the entire set of SecretKeys shared with the stewards. An exemplary document authentication process would incorporate a trusted party, referred to herein as a document vault, a special registered member of the community having a unique identifier within a special class of registrant identifiers that is associated with its function. Any registrant may submit a document with a digital signature to the document vault using a secure communications session established using the Composite Key protocol which irrefutably authenticates the registrant for the document signature. In response, the document vault may send the registrant a unique document number that has been assigned to the document by the document vault and stored in association with the document and other associated data fields in the secure database of the document vault. The associated data fields of each such document, uniquely identified by its document number within the secure database of the document vault, would, for example, identify the registrant that submitted and effectively signed the document as well as pertinent information such as date, time, etc. Subsequently, any party knowing a unique document number stored within a document vault could submit a query via a secure communications session with the document vault to obtain a copy of the document and all related fields, including the identity of the registrant that submitted and signed the document. Optionally, multiple document vaults could be employed, allowing a registrant to independently submit the same document to two different document vaults and obtain a unique document number from each document vault. Such redundant storage of a signed document further assures its immutability since copies of any document retrieved from different document vaults must be identical to be deemed valid.

Another example of an application of the present invention would support point-of-sale transactions involving three registrants. A protocol instance of Composite Key Cryptography could be implemented in which two different stewards distribute SeedKeys used to establish secure communication sessions for point-of-sale transactions involving three registrants, a customer, a retailer, and a financial institution (registrants C, R, and F, respectively). The exemplary sequence of messages would result in the creation and selective distribution of four different SeedKeys, the first three SeedKeys restrictively generated by a first steward and the fourth SeedKey restrictively generated by a second steward. The selective distribution of SeedKeys would provide only three of the SeedKeys within encrypted data packets to each registrant, allowing each registrant to produce two different SessionKeys by merging different pairs of SeedKeys, each pair comprised of one SeedKey from each steward. These two SessionKeys would then enable each registrant to establish secure communications with each of the other registrants with assurance that the third registrant would be excluded.

For example, registrant C could choose and cooperate with a first steward to restrictively generate a first SeedKey which the first steward would use to produce a second and third SeedKey by reordering all values within the first SeedKey in a manner that ensures that no value appears in the same location within the three different SeedKeys. Imposing this additional constraint upon the three SeedKeys would be a relatively simple programming task for anyone experienced in the art. The first steward would then build a data packet for each participating registrant, encrypting each packet using the SecretKey shared by the first steward with each respective registrant. The data packet for each registrant would contain a different pair of SeedKeys. For example, the data packet for registrant C would contain the first and second SeedKeys, the data packet for registrant R would contain the first and third SeedKeys, the data packet for registrant F would contain the second and third SeedKeys.

Registrant R would choose a second steward, different from the first steward, and cooperate with the second steward to restrictively generate a single SeedKey, the fourth SeedKey of the protocol instance. The second steward would then build a data packet for each participating registrant containing the fourth SeedKey. Each packet is encrypted using the SecretKey shared by the second steward with each respective registrant.

After the three registrants have received and decrypted all their respective data packets, each registrant would be able to create SessionKeys which would support a secure communications session with each of the other registrants with assurance that the third registrant is excluded. For example, registrants C and R would use the first and fourth SeedKeys to generate SessionKeys for their secure sessions; registrants C and F would use the second and fourth SeedKeys to generate SessionKeys for their secure sessions; and registrants R and F would use the third and fourth SeedKeys to generate SessionKeys for their secure sessions. Each of these sessions, all enabled via the same protocol instance, excludes a different registrant from one of the sessions. An alternative method would incorporate three separate protocol instances, each instance initiated by a different one of the parties to securely communicate with another one of the parties (e.g., the first instance securely connecting C to R, the second instance securely connecting R to F, and the third instance securely connecting F with C).

Thus, the customer may securely communicate solely with the financial institution to authorize a payment of a certain amount to the retailer, assured that the retailer is excluded from the secure session and thereby unable to influence the information exchanged. The financial institution could then securely communicate solely with the retailer, authorizing the payment, and the retailer could then securely communicate solely with the customer to conclude the transaction.

Other exemplary applications of the Composite Key protocol include secure cell phone calls, secure conference calls, irrefutable and immutable digital checks, credit card transactions, and ATM withdrawals. An ATM withdrawal could be made particularly convenient by using the Composite Key protocol. For example, a secure communications session may be established between a customer and an ATM machine to create a one-time PIN with a very short expiration period and a specific amount of cash. The customer, after creating the PIN, would then be able to withdraw the cash from the ATM machine without an ATM card, using only the one-time PIN in the same manner that one currently uses a fixed PIN and an ATM card.

Implementation Issues

The concept of a Composite Key offers practical solutions to many similar problems, each solution relying upon the fact that only the registrant has the Composite Key. One approach for protecting the Composite Key of a registrant is to implement a personal security device with a hardware chip which protects against emissions of electronic pulses or other radiations which could divulge SecretKey information or processing-state values that would compromise a Composite Key or a protocol instance. The personal security device would also protect the Composite Key against indiscriminate use by encrypting it with a password selected by the registrant. This password may be created, and subsequently recreated, by the registrant using a trusted path incorporated on the chip. The password would be used by the personal security device to construct a SecretKey used to initialize a symmetric encryption algorithm to encrypt the Composite Key. For example, the registrant may establish a password used to construct a SecretKey which is used to encrypt the Composite Key by selecting a sequence of images within albums of photographs or graphical symbols, each of which might specify only a fragment of a SecretKey. The encrypted Composite Key may then be decrypted by reproducing the password, unlocking it for a single use only when the decryption of the Composite Key is successful, which may be authenticated by various methods, as would be understood by one of ordinary skill in the art. Optionally, a duress password scheme could also be implemented which would apparently unlock the Composite Key, but which would trigger a security alarm to each steward or other third party participating in a protocol instance. The personal security device may also provide GPS coordinates in such instances to a participating steward to aid local authorities in locating the device.

Similarly, the secure facility and server supporting each steward must be adequately protected against adversarial attempts to glean information about the SecretKeys within its Composite Key. In addition to adhering to strict operational procedures and two-person controls, careful consideration should be given to adopting adequate cross domain solutions that would shield the processor and database of the steward against emissions and covert data and timing channels that might be exploited by hackers or cryptanalysis experts. The most secure protocol and cryptographic strategies may be rendered almost worthless by inadequate implementation strategies.

General Terminology

To eliminate ambiguity, but not to limit the claimed invention, certain terms used herein may be defined as follows:

SecretKey: An array of byte values used as a symmetric encryption key, secretly shared by two entities and which may be limited to containing no duplicate values Composite Key: A set of SecretKeys known in its entirety only to a single entity, each SecretKey being shared by that entity with a different entity InstanceCounter: A value maintained in the local database of each steward and registrant which is incremented and stored and then used in lieu of a date/time stamp within protocol messages, a copy of the last such InstanceCounter received from another entity within a valid protocol packet being recorded in association with the SecretKey of that entity within the Composite Key of the recipient Steward: A secure trusted third party server which shares a SecretKey with every registered user and, optionally, other stewards, the set of these SecretKeys comprising the Composite Key of the steward, each SecretKey within the Composite Key being associated with the unique identifier and InstanceCounter of the single entity sharing that SecretKey Registrant: A registered member of a community having a Composite Key with a set of SecretKeys, each SecretKey associated with the unique identifier and InstanceCounter of a different steward, for all stewards RootKey: A plurality of byte values that may be used to specify a plurality of unique byte values which will appear within a restrictively generated SeedKey OrderKey: A plurality of byte values that may be used to specify a plurality of unique byte values used to determine a reordering of the unique byte values specified by a RootKey to restrictively generate a SeedKey SeedKey: A temporary SecretKey securely distributed to communicating parties via a single steward, and which is unknown to unauthorized parties and other stewards SessionKey: A temporary SecretKey created for the purpose of initializing a symmetric encryption algorithm to support secure communication sessions between communicating parties, and which is produced by merging two or more SeedKeys known to the communicating parties, each SeedKey unknown to more than one steward, in a manner such that the SessionKey is unknown to any party not knowing every merged SeedKey Composite Key Protocol: An innovative strategy that utilizes symmetric encryption sessions created using the Composite Keys of a community of stewards and registrants to securely distribute two or more SeedKeys to a plurality of participating parties to establish secure communication sessions in a manner that ensures that only the participating parties know the SessionKeys generated by merging the SeedKeys, and that also authenticates each participating party to each of the other participating parties Exemplary Methods Specifications are presented herein which illustrate exemplary methods which support the generation of parameters exchanged within the messages of the exemplary Composite Key protocol. The illustrated methods are examples of many alternative strategies that have been designed, implemented and tested by the inventor. Further, the purpose of the presented methods is to clarify the tasks performed without concern for efficiency. While a minimum SIZE of 32 bytes is recommended for SecretKeys, the exemplary methods may be used to produce SecretKeys having other SIZE values (e.g., 64, 128, or even 256 bytes). However, it is important to note that SecretKeys having a SIZE larger than 32 bytes should be constructed by repeatedly using the methods described herein to produce and concatenate multiple 32-byte SecretKeys, each containing no duplicate values and all having no values in common. Adopting this strategy for generating SecretKeys having a SIZE larger than 32 bytes limits a participating steward to reordering sets of bytes, preventing an unacceptable level of influence by any single participant over the construction of the SecretKeys produced by the protocol methods.

Throughout the description of the exemplary methods, every instance of the array FLAGS is assumed to contain 256 bytes. The array parameters of the exemplary Combine and Merge methods are all assumed to contain 32 bytes. All other parameter arrays are assumed to contain SIZE bytes, and it is also assumed that no output array occupies the same memory locations as an input array. The illustrated methods also assume that all input parameters are otherwise valid, performing no validity checks. Such validity checks should certainly be introduced for practical implementations.

Randomize

An unspecified method that pseudo-randomly generates an OUTPUT array having SIZE byte values. Many publicly known pseudo-random functions are feasible since the values produced need not be repeatable, as long as the values produced are unpredictable. One feasible approach would be the inclusion of a one-time pad stored within the local database of each entity. This one-time pad would provide pseudo-random values which would be used only once, and could be refreshed as needed by repeatedly encrypting all values within the one-time pad using an encryption session established during creation of a protocol instance, but only after the encryption session is no longer required for use within the protocol.

DEFINITION: Randomize (OUTPUT, SIZE)

Join

An exemplary method that pair-wise combines SIZE byte values of array FIRST with the corresponding byte values of array SECOND using the Boolean exclusive- or (XOR) operation to create values which are stored into array OUTPUT. In the following pseudo-code, I is a temporary byte variable:

```
DEFINITION: Join (FIRST, SECOND, OUTPUT, SIZE)
    FOR I ← [0...SIZE − 1]
        OUTPUT [I] ← FIRST [I] XOR SECOND [I]
    END FOR
```

Derive

An exemplary method that uses values from an INPUT array of SIZE bytes to selectively construct an OUTPUT array of SIZE bytes such that no value occurs more than once in OUTPUT. Each value in OUTPUT is selected only from among those values for which the parameter array FLAGS has a zero in the corresponding entry, which is then set to a non-zero value. The exemplary method seeks for a zero entry within FLAGS using a dynamic increment, INC. INC is set only to odd values in the range {1, 3, 5 . . . 253, 255} to ensure that every entry in FLAGS is a candidate for each search. In the following pseudo-code, INC, I, and N are temporary byte variables:

```
DEFINITION: Derive (INPUT, FLAGS, OUTPUT, SIZE)
    INC ← INPUT [0] + INPUT [SIZE - 1] (modulo 256)
    INC ← INC + INC + 1 (modulo 256)
    FOR I ← [0...SIZE - 1]
        N ← INPUT [I]
        WHILE FLAGS [N] ≠ 0
            N ← N + INC (modulo 256)
        END WHILE
        OUTPUT [I] ← N
        FLAGS [N] ← 1
        INC ← INC + N + N (modulo 256)
    END FOR
```

Reorder

An exemplary method that produces an OUTPUT array of SIZE bytes by shuffling values supplied in an INPUT array of SIZE bytes using pairs of unique values generated from an ORDERING array, also an array of SIZE bytes. In the following pseudo-code, FLAGS and GUIDE are temporary arrays; I, J and K are temporary byte variables:

```
DEFINITION: Reorder (INPUT, ORDERING, OUTPUT, SIZE)
    FOR I ← [0...255]
        FLAGS [I] ← 1
    END FOR
    FOR I ← [0...SIZE - 1]
        FLAGS [I] ← 0
    END FOR
    Derive (ORDERING, FLAGS, GUIDE, SIZE)
    J ← INPUT [ORDERING [0]] + INPUT [ORDERING [0]] + 1
    (Modulo SIZE)
    FOR I ← [0...SIZE - 1]
        K ← I XOR J
        OUTPUT [K] ← INPUT [GUIDE [I] ]
    END FOR
```

Combine

An exemplary method that uses two 32-byte input arrays, ROOTKEY and ORDERKEY, to restrictively generate a 32-byte SecretKey which is returned in OUTPUT. The methods employed ensure that any party controlling the contents of only one of the input arrays is unable to dictate results. The ROOTKEY array determines an ordered set of unique values that will be present within OUTPUT and the ORDERKEY array determines the shuffling of those values in OUTPUT.

Note that the exemplary method could be modified to generate as many as eight different SecretKeys, each having a SIZE of 32 bytes, by repeatedly calling Derive without clearing the FLAGS array after each call, supplying each previously generated OUTPUT as the next input ROOTKEY. A concatenation of all eight 32-byte SecretKeys produced in this manner would create a 256-byte SecretKey that contains every byte value in the range {0 . . . 255} once, and only once. Another strategy that has been implemented and tested to similarly generate multiple SeedKeys modifies the OrderKey before the shuffling of each additional SeedKey, for example, by using the previously generated SeedKey as an OrderKey parameter to shuffle the values within the OrderKey itself using the Reorder method.

In the following pseudo-code, FLAGS and TEMP are temporary arrays; I is a temporary byte variable:

```
DEFINITION: Combine (ROOTKEY, ORDERKEY, OUTPUT)
    FOR I ← [0...255]
        FLAGS [I] ← 0
    END FOR
    Derive (ROOTKEY, FLAGS, TEMP, 32)
    Reorder (TEMP, ORDERKEY, OUTPUT, 32)
```

Merge

An exemplary method that uses two 32-byte input arrays, FIRST and SECOND, to generate a different 32-byte SecretKey in each of the two output arrays, OUTPUT1 and OUTPUT2, in a manner such that the two generated output arrays have no values in common. The strategy employed ensures that any party not knowing both of the two input arrays is unable to determine any information about either of the resulting output arrays. While the methods employed also ensure that each of the output arrays contain no duplicate values, other strategies have been implemented and tested which allow duplicates within an output array and, optionally, allow the two output arrays to have values in common. In the following pseudo-code, FLAGS and TEMP are temporary arrays; I is a temporary byte variable:

```
DEFINITION: Merge (FIRST, SECOND, OUTPUT1, OUTPUT2)
    FOR I ← [0...255]
        FLAGS [I] ← 0
    END FOR
    Join (FIRST, SECOND, TEMP, 32)
    Derive (TEMP, FLAGS, OUTPUT1, 32)
    Derive (OUTPUT1, FLAGS, TEMP, 32)
    Reorder (TEMP, FIRST, OUTPUT1, 32)
    Derive (OUTPUT1, FLAGS, OUTPUT2, 32)
    Derive (OUTPUT2, FLAGS, TEMP, 32)
    Reorder (TEMP, SECOND, OUTPUT2, 32)
```

Exemplary Processing Machine

Figure 17:
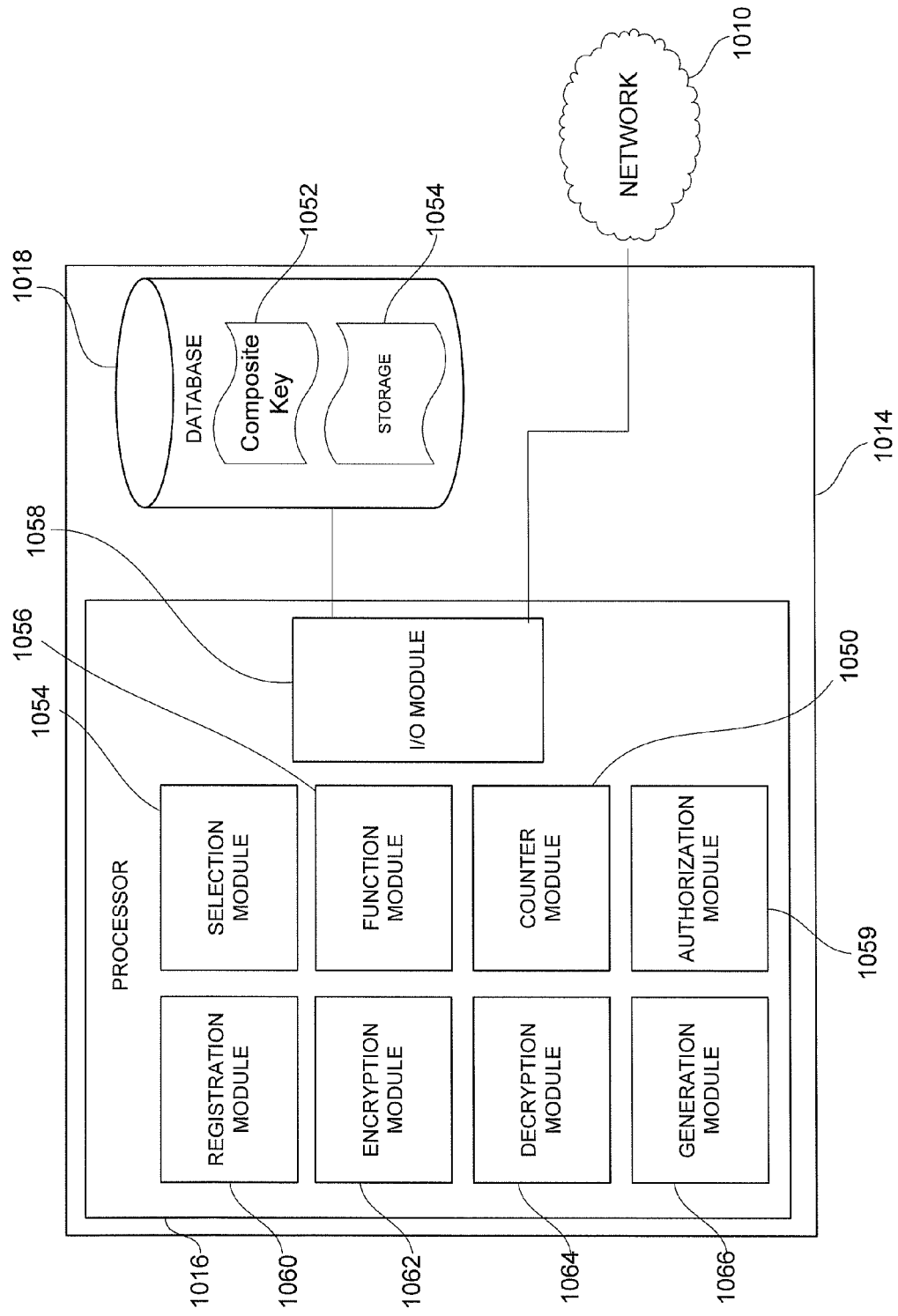
FIG. 17 is a schematic illustration of a processing machine usable in the systems and methods according to various embodiments of the invention.

FIG. 17 is a block diagram of an illustrative data processing machine that can be used in various embodiments of the invention. The system of the invention or portions of the system of the invention may be in the form of a "processing machine," 1014 such as a general purpose computer, for example. As used herein, the term "processing machine" 1014 is to be understood to include at least one processor 1016 that uses at least one memory or database 1018. The at least one memory 1018 may store a set of instructions in storage 1054 and may also store the Composite Key 1052. The instructions may be either permanently or temporarily stored in the memory or memories of the processing machine. The processor 1016 executes the instructions that are stored in the memory or memories in order to process data. The set of instructions may include various instructions that perform a particular task or tasks, such as those tasks described above with reference to FIGS. 2-16. Such a set of instructions for performing a particular task may be characterized as a program, software program, or simply software.

As noted above, the processing machine executes the instructions that are stored in the memory or memories to process data. This processing of data may be in response to commands by a user or users, such as the registrants or stewards described above, of the processing machine, in response to previous processing, in response to a request by another processing machine and/or any other input, for example. Clearly, resistance to backdoor programs would require such programs to be in protected subsystem parts of processing machines so that their contents could not easily be read by intruding code. Such designs are becoming more commonplace both in computers and cell phones.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a cell phone or personal security device, a programmable logic device such as a FPGA, PLD, PLA or PAL, or any other device or arrangement of devices that is capable of implementing the steps of the process of the invention.

It is appreciated that in order to practice methods of the invention as described above, it is not necessary that the processors and/or the memories of the processing machine be physically located in the same geographical place. That is, each of the processors and the memories used in the invention may be located in geographically distinct locations and connected so as to communicate in any suitable manner (e.g., via network 1010). Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations, for example. The two distinct pieces of equipment may be connected in any suitable manner. Additionally, the memory may include two or more portions of memory in two or more physical locations.

To explain further, processing as described above is performed by various components (e.g., modules) and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity (i.e., so as to obtain further instructions or to access and use remote memory stores, for example). Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine (i.e., to a particular type of computer, for example). The computer understands the machine language.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression, encryption, or decryption technique or algorithm, as may be desired. An encryption module 1062 might be used to encrypt data and a decryption module 1064 might be used to decrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions (i.e., the software, for example) that enables the computer operating system to perform the operations described above may be contained on any of a wide variety of media or medium, as desired. Further, the data that is processed by the set of instructions might also be contained on any of a wide variety of media or medium. That is, the particular medium (e.g., the memory in the processing machine) utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, an external hard disk or flash drive, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine 1014 as it processes a set of instructions and/or provide the processing machine with information. Accordingly, the user interface is any device that provides communication between a user and a processing machine. For example, with reference to FIG. 17, various entities, such as registrants and stewards, may communicate with each other using I/O Module 1058. The information provided by the user to the processing machine 1014, or more specifically, to I/O Module 1058, through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact (i.e., convey and receive information) with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

FIG. 17 shows an exemplary processing machine 1014 comprising various modules and a database 1018. Each entity, may perform the methods of the present invention using the exemplary processing machine 1014, and may communicate with each other using the I/O module 1058 via a network 1010. Nevertheless, the stewards preferably use a robust, secure server to perform their various functions, as would be understood by one of ordinary skill in the art.

Database 1018 may store copies of various information values such as identifiers, SecretKeys, Composite Keys, SeedKeys, RootKeys, OrderKeys, SessionKeys, SessionStrings, queue entries, counts for a counter such as the InstanceCounter, various instruction code such as the exemplary methods described above, etc. Information may be stored in storage 1054 or may be within a more secure location of database 1018. For example, the Composite Key 1052 may be stored in a more secure location of database 1018, as may other information.

Registration module 1016 may be used in conjunction with the generation module 1066 during creation or revision of a Composite Key.

Encryption module 1062 may be used to encrypt data before sending requests or responses to requests. Decryption module 1064 may be used to decrypt all or a portion of requests or responses to requests. The encryption and decryption modules may be used to encrypt and decrypt in accordance with the stream cipher disclosure discussed above.

Generation module 1066 can also be used by any entity when performing methods of the present invention. For example, registrants X and Y may use their respective generation modules to generate RootKeys, SessionStrings, SeedKeys, and SessionKeys as might be required within various requests or responses such as those illustrated in FIG. 4, including DeriveKey Requests and Responses, Relay Requests and Responses, Confirmation Requests and Responses, etc. Generation module 1066 may also regenerate or reproduce various keys including SeedKeys, SessionKeys, or other information. Stewards SX and SY may use their respective generation modules to generate OrderKeys, SeedKeys, SessionStrings, or other necessary information. Generation module 1066 may be used to generate or regenerate other data packets or information as needed by the respective entities. In other words, generate may also understood to include regeneration or reproduction of information. Generation of data packets or information may be pseudo-random, random, automatic, etc., as would be understood by one of ordinary skill in the art. Pseudo-random or random generation of keys, for example, may be adopted to ensure that no single entity is able to obtain sufficient knowledge to control the generation of keys by another entity. Generation module 1066 may work in conjunction with function module 1056 when generating or regenerating information.

Selection module 1054 can also be used by any entity when performing methods of the present invention. For example, selection module 1054 may be used to select a steward to assist in establishing a secure communications session. Selection module 1054 may take into account a particular choice by a user of the system, or may randomly or pseudo-randomly select an entity to assist in the various methods of the present invention.

Function module 1056 may be used to call and execute various functions when performing the various methods of the present invention such as Derive, Combine, Merge, etc. Exemplary methods are described above and various functions may be called upon to carry out these methods. Database 1018 may store code that may be called by function module 1056. Function module 1056 may work in conjunction with other modules, including generation module 1066, to carry out the methods of the present invention.

Counter module 1050 can also be used by any entity when performing methods of the present invention. Counter module 1050 may update an entity's locally maintained count and store a particular count in a counter, such as the InstanceCounter, to aid in identifying valid data packets or, more simply, to aid in carrying out the methods of the present invention. Particular counts of the InstanceCounter, for example, may be stored in database 1018.

Authorization module 1059 can also be used by any entity when performing methods of the present invention. Authorization module 1059 may be used to assist in authenticating data packet contents associated with one or more entities to one or more other entities. For example, authorization module 1059 may assist in authenticating a registrant to a steward, or during a Relay Exchange or Confirmation Exchange in which two registrants are authenticated to each other. Authorization module 1059 may also be used to authorize "wiretaps" within the system, as described above.

I/O module 1058 may be used by a single entity to retrieve data from database 1018, or may be used to communicate with other entities via, for example, network 1010.

It will be appreciated that the processing machine 1014 may be usable as either a registrant or steward data processor or both a registrant and a data processor. In some embodiments, the processor 1016 of the processing machine 1014 may include a registration module 1060 that is configured to carry out instructions associated with a registration procedure used to associate the processing machine with the other registrant and steward data processors. This process may include generation and storage of the secret keys shared with the various steward data processors (Trusted Parties).

It will be readily understood by those persons skilled in the art that the present invention is susceptible to broad utility and application. Many embodiments and adaptations of the present invention other than those herein described, as well as many variations, modifications and equivalent arrangements or transmission of information, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A method for facilitating secure data communication between a first communicating party and a second communicating party by a first trusted party, the first and second communicating parties being members of a set of registrants, the method comprising:
    storing, by the first trusted party on a trusted party processing machine comprising a processor, a digital composite key comprising a plurality of secret keys, each of the plurality of secret keys being known only to the first trusted party and exactly one member of the set of registrants, the plurality of secret keys including a first communicating party key known only to the first trusted party and the first communicating party and a second communicating party key known only to the first trusted party and the second communicating party;
    receiving by the first trusted party first information encrypted by the first communicating party using the first communicating party key;
    encrypting second information by the first trusted party using the second communicating party key to provide first encrypted second information;
    sending the first encrypted second information by the first trusted party to the second communicating party,
    wherein the second information is configured for use by the first and second communicating parties in conjunction with third information provided by a second trusted party to generate at least one session key for encrypting communication between the first and second communicating parties, knowledge of both of the second and third information being necessary to generate or determine the at least one session key and
    wherein the second information includes a first seed key determined by the first trusted party using the first information and the third information includes a second seed key provided by the second trusted party so that at least one of the first and second seed keys is unknown to each of the first and second trusted parties and the at least one session key cannot be generated or determined from either the first or second seed key alone.

2. The method of claim 1 wherein the second information is sent to the second communicating party via at least one intermediate party.

3. The method of claim 2 wherein the at least one intermediate party is or includes the first communicating party.

4. The method of claim 1 wherein the second information is constructed at least in part based on the first information.

5. The method of claim 1 wherein the second information is or includes at least a part of the first information and the method further comprises:
    decrypting the encrypted first information by the first trusted party using the first communicating party key.

6. The method of claim 1 further comprising:
    encrypting the second information by the first trusted party using the first communicating party key to provide second encrypted second information; and
    sending the second encrypted second information to the first communicating party.

7. The method of claim 1 wherein the action of sending by the first trusted party the first encrypted second information to the second communicating party includes
    transmitting the first encrypted second information to the first communicating party for retransmission by the first communicating party to the second communicating party.

8. The method of claim 1 further comprising:
    modifying the first information by the first trusted party to produce the second information.

9. The method of claim 8 wherein the action of modifying the first information includes:
    determining a first seed key comprising a first plurality of ordered byte values within the first information,
    reordering the first plurality of ordered byte values to create a first modified seed key and
    replacing the first seed key with the first modified seed key.

10. A steward data processing system for facilitating secure communication sessions between two or more registrant parties, the system comprising a steward data processing machine configured for
    selective communication with each registrant party over a network,
    storing a digital composite key comprising a plurality of secret keys, each of the plurality of secret keys being known only to the steward data processing machine and exactly one of the registrant parties,
    receiving from a first registrant party a first encrypted data packet comprising first information encrypted by the first registrant party using the secret key known only to the first registrant party and the steward data processing machine,
    encrypting second information using the secret key known only to the steward data processing machine and a second registrant party to provide a second encrypted data packet, the second information including at least a portion of the first information and comprising a first seed key configured for use by the first and second registrant parties in combination with a second seed key to generate at least one session key for encrypting communications between the first and second registrant parties, and sending the second encrypted data packet to the second registrant data processing machine, wherein the second seed key is unknown to the steward data processing machine and the at least one session key cannot be generated or determined from either the first seed key or the second seed key alone.

11. The system of claim 10 wherein the steward data processing machine is further configured for:

encrypting the second information using the secret key known only to the steward data processing machine and the first registrant party to provide a third encrypted data packet, and sending the third encrypted data packet to the first registrant party.

12. The system according to claim 10 wherein the steward data processing machine is further configured for modifying the first information to produce the second information.

13. The system according to claim 12 wherein the action of modifying the first information includes determining the first seed key comprising a first plurality of ordered byte values within the first information, reordering the first plurality of ordered byte values to create a first modified seed key, and replacing the first seed key with the first modified seed key.

14. The system of claim 10 wherein the second information is or includes at least a part of the first information and the steward data processing machine is further configured for:

decrypting the encrypted first information by the first trusted party using the first communicating party key.

* * * * *